(12) United States Patent
Chou et al.

(10) Patent No.: US 8,762,961 B2
(45) Date of Patent: *Jun. 24, 2014

(54) METHODS FOR SELECTIVELY PRUNING FALSE PATHS IN GRAPHS THAT USE HIGH-PRECISION STATE INFORMATION

(71) Applicant: Coverity, Inc., San Francisco, CA (US)

(72) Inventors: Andy Chou, San Francisco, CA (US); Sumant J. Kowshik, San Francisco, CA (US)

(73) Assignee: Coverity, Inc., San Francisco, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 13/745,946

(22) Filed: Jan. 21, 2013

(65) Prior Publication Data

US 2013/0198725 A1    Aug. 1, 2013

Related U.S. Application Data

(63) Continuation of application No. 12/197,197, filed on Aug. 22, 2008, now Pat. No. 8,359,583.

(60) Provisional application No. 60/965,866, filed on Aug. 22, 2007.

(51) Int. Cl.
*G06F 9/44* (2006.01)
*G06F 17/50* (2006.01)
*G06F 9/455* (2006.01)

(52) U.S. Cl.
USPC ............................ 717/132; 716/104; 716/106

(58) Field of Classification Search
USPC .......................................... 717/132; 716/104
See application file for complete search history.

(56) References Cited

U.S. PATENT DOCUMENTS

| 5,313,616 | A | * | 5/1994 | Cline et al. | 717/127 |
|---|---|---|---|---|---|
| 5,648,909 | A | * | 7/1997 | Biro et al. | 716/102 |
| 6,904,590 | B2 | * | 6/2005 | Ball et al. | 717/132 |
| 7,340,726 | B1 | | 3/2008 | Chelf | |
| 7,650,583 | B2 | * | 1/2010 | Chang | 716/113 |
| 7,958,470 | B1 | * | 6/2011 | Siarkowski | 716/104 |
| 2007/0157169 | A1 | * | 7/2007 | Chen et al. | 717/120 |
| 2009/0077542 | A1 | | 3/2009 | Chou et al. | |

OTHER PUBLICATIONS

Manevich et al., "PSE: Explaining Program Failures via Postmortem Static Analysis," ACM, 2004.*
Xie et al., L stag Redundancies to Find Errors, IEEE, 2003.*
"U.S. Appl. No. 12/197,197, Examiner Interview Summary mailed Jul. 18, 2012", 2 pgs.

(Continued)

*Primary Examiner* — Ryan Coyer
(74) *Attorney, Agent, or Firm* — Schwegman Lundberg & Woessner, P.A.

(57) ABSTRACT

Methods are provided that allow a false path pruner to traverse a directed acyclic graph in conjunction with one or more checker programs that are analyzing a program for defects or other artifacts of interest. While the checkers may have ways of avoiding re-traversal of portions of the graph that have already been traversed, the false path pruner may override such decisions made by the checkers as a result of a false path in order to allow re-traversal during a future different traversal when that same defect or artifact may not lie along a false path, and therefore avoid missing a valid defect or artifact. Computer programs stored on tangible media are provided that implement the methods of the invention.

1 Claim, 61 Drawing Sheets

(56) References Cited

OTHER PUBLICATIONS

"U.S. Appl. No. 12/197,197, Notice of Allowance mailed Sep. 17, 2012", 8 pgs.
"Automating static analysis to deliver highe-quality software", Rational software, IBM Software Group; Development solutions, White paper, (May 2008).
Cole, Brian, et al., "Improving Your Software Using Static Analysis to Find Bugs", Dept. of Computer Science, University of Maryland, College Park MD; OOPSLA'06, (2006), 22-26.
Manevich, Roman, et al., "PSE: Explaining Program Failures via Postmortem Static Analysis", ACM, (2004), 10 pgs.
Xie, et al., "Using Redundancies to Find Errors", IEEE, (2003), 14 pgs.

\* cited by examiner

METHODS FOR SELECTIVELY PRUNING FALSE PATHS IN GRAPHS THAT USE HIGH-PRECISION STATE INFORMATION

CROSS-REFERENCE TO RELATED APPLICATIONS

This application is a continuation of and claims priority under 35 U.S.C. 120 to U.S. patent application Ser. No. 12/197,197, filed on Aug. 22, 2008, which claims priority to commonly-owned U.S. Provisional Patent Application Ser. No. 60/965,866 entitled "METHODS FOR SELECTIVELY PRUNING FALSE PATHS IN GRAPHS THAT USE HIGH-PRECISION STATE INFORMATION," filed on Aug. 22, 2007, which is expressly incorporated herein by this reference.

BACKGROUND OF THE INVENTION

Various applications, including but not limited to the analysis of software programs, benefit from the creation of directed graphs, and more specifically, directed acyclic graphs to represent flow concepts as appropriate to the application. A directed graph may consist of nodes and edges. An edge may connect one node to another, with a direction from one node to the other. Edges may be represented by arrows to indicate the direction. Two edges may be contiguous if one flows into a node and the other flows out of the same node. Directed graphs may have edges that "loop backwards"; that is, it is possible to follow a set of contiguous edges and return to the same node more than once. Such graphs are called cyclic. A directed acyclic graph, or DAG, may have no such backward edges. FIG. 1 illustrates an exemplary directed graph. Nodes are indicated by ovals, as exemplified by Node 100. Edges are represented by lines with arrows, as exemplified by Edge 102. Edges 102 and 103 are contiguous. Edge 104 is a backward edge that makes this a cyclic graph, since by traversing Edges 103, 105, 106, and 104, one can reach Node 107 more than once.

The entry point of the graph may refer to any node that has no incoming edge (except a backwards edge in the case of a cyclic graph); there may be more than one such node, but more typically there may be only one. The exit point of the graph may refer to any node that has no outgoing edge (except a backwards edge in a cyclic graph); there may be more than one such node, but more typically there may be only one. A path may consist of a sequence of contiguous edges flowing from the entry point of the graph to the exit point; a path segment may flow between any two nodes along a path. An edge may belong to more than one segment, and a segment may belong to more than one path. FIG. 2 illustrates an exemplary DAG. Node 200 is the entry point of the DAG; Node 201 is the exit point. Path 203 represents one possible path through the DAG; Segment 204 illustrates a segment. Edge 205 is shared between Segments 204 and 206, and Segment 204 is shared between Paths 203 and 207. One may speak of the relative position of one node with respect to the other such that if an edge or segment connects two nodes, the node from which the edge or segment flows may be said to be above the node into which the edge or segment flows. The act of moving along contiguous edges is referred to herein as traversal.

In an application wherein the use of a DAG represents control flow of the program, nodes may represent decisions, each of which may have more than one outgoing edge. Such a node will hereinafter be referred to as a fork point. Where a node represents a statement rather than a decision, it may typically represent a point in the program where two different flows merge. Such a node will be referred to hereinafter as a merge point. For the sake of clarity, blocks of code containing no decisions, herein referred to as linear blocks of code or simply code blocks, may also be represented on the graph. They do not, by definition, contain any control flow statements, but the contents of the linear code blocks may be useful for analysis. In order to further clarify the elements of a control flow graph, true control flow nodes will herein be represented by ovals, whereas linear code blocks will be represented by boxes.

FIG. 3 illustrates a control flow graph embodiment of the DAG of FIG. 2, with Node 300 representing a linear code block, and Node 301 representing a decision with two possible outcomes; this may represent a simple if/then/else construct in a program. Node 302 represents a decision with three possible outcomes; this may represent a case or switch construct in a program. Blocks 303 and 304, being contiguous, could, for the purposes of certain kinds of analysis, be combined into a single block without affecting the results of the analysis. Nodes 301 and 302 are fork points; Node 305 is a merge point.

In the context of certain kinds of analysis, cyclic graphs may be transformed into acyclic graphs. The specific nature of the application will determine whether this is possible, and how such a transformation might be made, and will be known to one of ordinary skill in the art within the application area. In an application using a DAG to represent a program control-flow graph, program loops, which are cyclic, may be unrolled to create a linear representation of their execution, assigning "unknown" or "havoc" values to variables as appropriate. Similarly, other conventional techniques including but not limited to function inlining or summarizing may be used to transform a cyclic program control flow graph into a DAG.

Certain types of analysis, including but not limited to identification of program defects using static analysis, may make use of DAGs to represent all possible execution flows of a program. A program performing such analysis will be referred to herein as a "checker." A checker may identify a variety of different program characteristics, defects, or artifacts of interest including but not limited to such examples as uninitialized variables, null pointer dereferences, and possible race conditions. Such a checker may traverse some or all paths in a DAG as it performs its search. This traversal of the DAG may be intended to simulate all possible execution flows of the program represented by the DAG.

A checker may attempt to traverse every possible unique path in a DAG. The method of accomplishing a complete traversal may vary. Methods include, but are not limited to, depth-first and breadth-first search, and using recursion to provide coverage or using worklists to record paths that must be traversed as branches are encountered.

According to the semantics of a graph in a given application, there may be paths containing mutual inconsistencies such that their traversal by a checker is not useful. In the example of a DAG representing program control flow, such paths would never be executed in the program represented by the DAG. Such mutually inconsistent paths are referred to hereinafter as false paths. Because different paths may share edges and segments, there may be edges or segments that belong both to valid paths and false paths.

Because of the amount of computing time and resources required to detect false paths, it may typically be easier to include false paths in analysis. However, including false paths may result in spurious analysis results. For example, in an application where a program control-flow graph is being analyzed for defects, any defects found as a result of analysis of false paths will not represent defects that could ever be encountered when the program executes. This would result in the reporting of invalid defects by the analyzer; such invalid defects will be hereinafter referred to as false positives. In this and other applications, it may be appreciated that it is desirable to reduce the number of false positive results produced by the analyzers. A process that systematically identifies and removes false paths from a DAG may be referred to as false path pruning.

Conventional methods of detecting and avoiding false paths may use state information that causes the elimination of some false positives, but at the cost of causing some valid defects to be missed. It may therefore be appreciated that there remains a need for a more precise method of discrimination between valid and false paths that avoids both excessive false positive reports and missing defects, and that is efficient both from an execution time and resource consumption standpoint.

DETAILED DESCRIPTION OF EXEMPLARY EMBODIMENTS OF THE INVENTION

A False Path Pruner (FPP) is provided that traverses a DAG at the same time as one or more checkers traverse the DAG. All checkers and the FPP traverse the DAG in concert, and at any given time, all checkers and the FPP will visit the same node. Defects and artifacts of interest to a checker will be referred to herein as triggers. Detection and reporting of all triggers existing on non-false paths, without reporting false positives, may be accomplished through the following exemplary embodiment of the invention.

Figure 1:
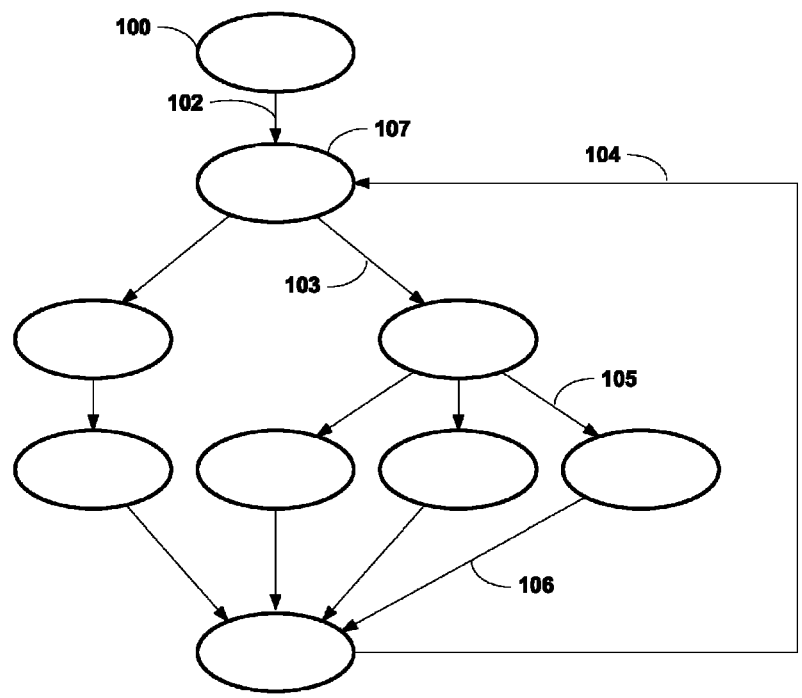
FIG. 1 illustrates a directed graph.
Figure 2:
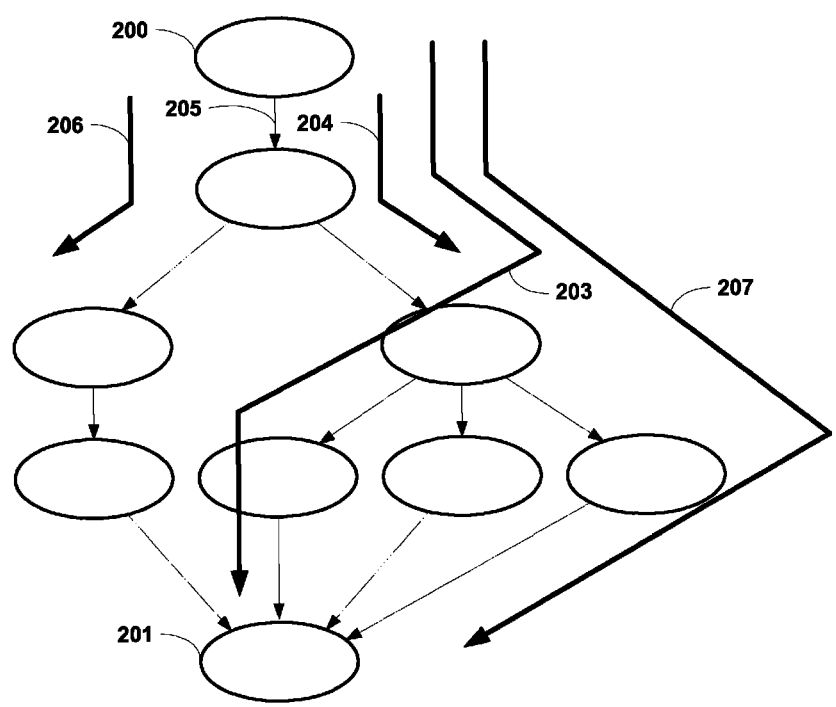
FIG. 2 illustrates a directed acyclic graph (DAG), paths, and segments.
Figure 3:
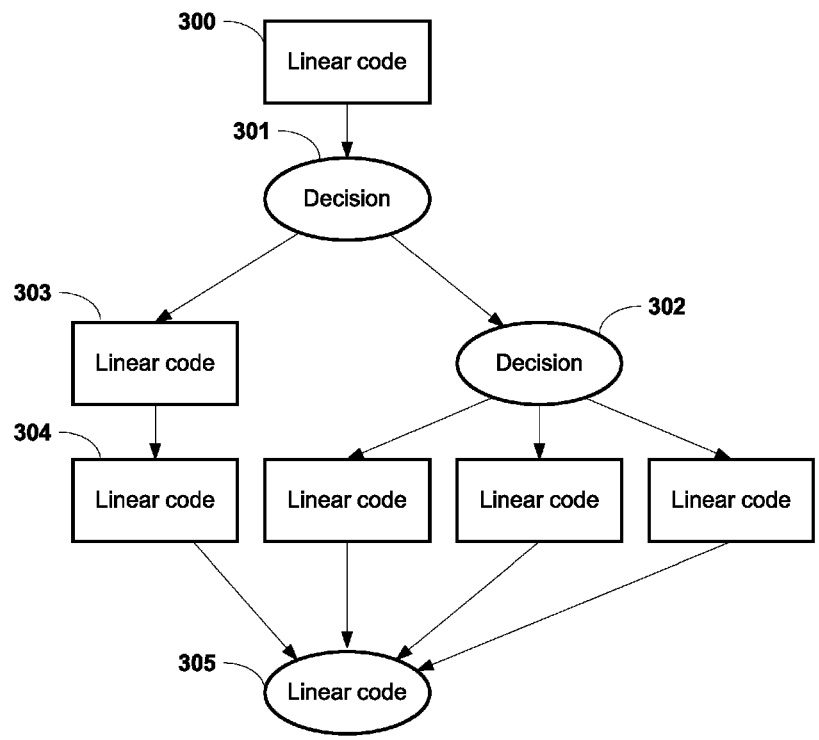
FIG. 3 illustrates a program control flow graph as an embodiment of a DAG.
Figure 4:
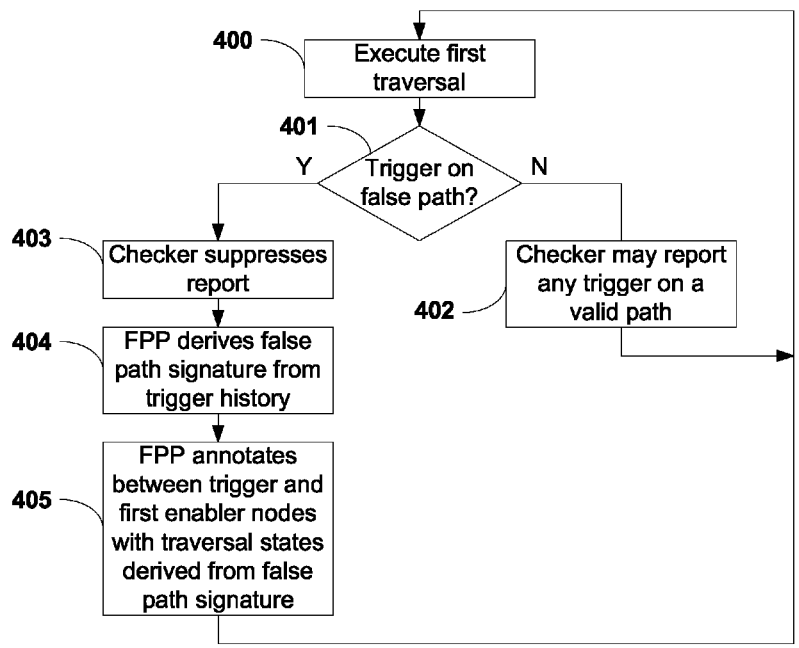
FIG. 4 depicts an exemplary process for annotating nodes in accordance with embodiments of the invention.

A first traversal of a path occurs along which a trigger may be encountered. FIG. 4 illustrates an example of what may happen along this first traversal in accordance with embodiments of the invention. In Block 400, each node is visited along the path as the checker looks for triggers. Decision 401 indicates that upon encountering a trigger, the FPP tests the path to see if the path is false in a manner described below. If the node does not contain a trigger on a false path, then the checker may report any trigger on a valid path (Block 402).

If the trigger path is false, the checker may suppress reporting of the trigger (Block 403), and a false path signature is derived from the traversal history (Block 404), and the FPP annotates nodes between the trigger and a first enabler node with a traversal state derived from the false path signature (Block 405). What constitutes a first enabler node, which nodes are annotated, how a history is maintained, how a false path signature may be derived from the history, and how a traversal state may be derived from the false path signature for each annotated node are explained in more detail below. Whether or not the path is false, the checker may also provide its own annotation of the DAG in accordance with prior art. Each checker and the FPP may maintain its own independent set of annotations of the DAG.

Figure 5:
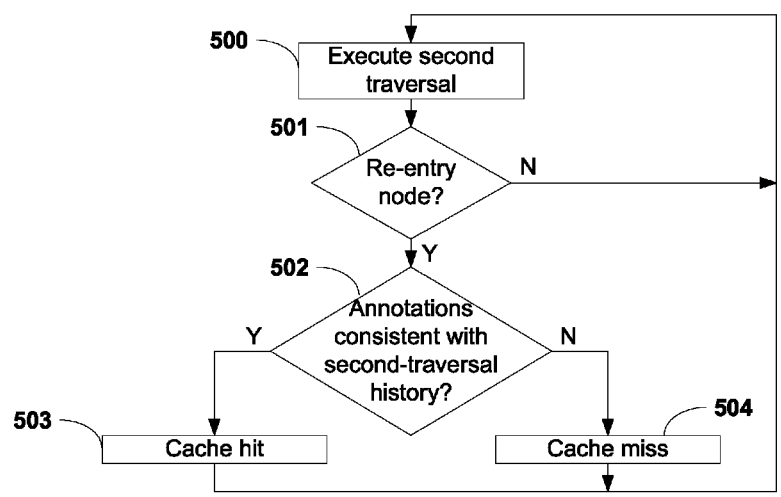
FIG. 5 depicts an exemplary process for traversing a graph in the presence of annotations, in accordance with embodiments of the invention.

As illustrated in the exemplary process of FIG. 5, in accordance with embodiments of the invention, a second traversal of another path may occur (Block 500) along which a node may be encountered (Decision 501) that was part of the first path; this node will be referred to as the "re-entry node." Further traversal at this point re-traverses portions of the DAG already traversed in the first traversal.

The re-entry node is checked by the FPP and any checkers for annotation. Each checker may also independently test its annotations in accordance with prior art to determine whether the re-traversal should continue. The decision to re-traverse may be referred to as a cache miss; the decision not to re-traverse may be referred to as a cache hit. In accordance with embodiments of the invention, the FPP tests any annotations to determine whether the annotated traversal state is consistent with the history of the current traversal (Decision 502); if it is, the FPP declares a cache hit (Block 503); if not, the FPP declares a cache miss (Block 504) in order to revisit a trigger along what was a false path on the prior traversal. The manner in which a traversal state is tested for consistency with the history is described in detail below.

Figure 6:
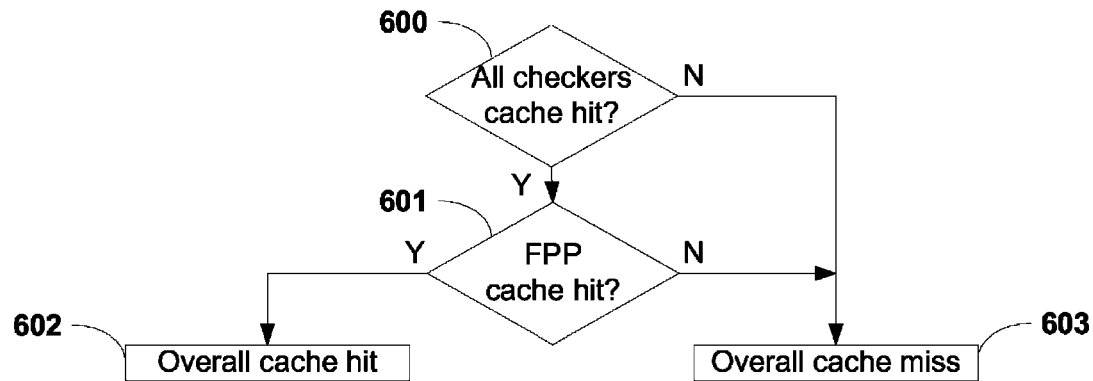
FIG. 6 illustrates an exemplary process for determining an overall cache hit or miss result from the cache hit/miss results of one or more checkers and an FPP, in accordance with embodiments of the invention.

FIG. 6 illustrates an exemplary process for resolving the independent cache hit/miss decisions made by the checkers and FPP into an overall final cache hit/miss decision. In accordance with embodiments of the invention, if all checkers and the FPP declare a cache hit (Decisions 600 and 601), then an overall cache hit is declared (Block 602) and the current traversal will not proceed beyond the re-entry node; if the FPP does not declare a cache hit (Decision 601), then an overall cache miss is declared (Block 603) and the current traversal will continue regardless of the determination of the checkers. If any of the checkers does not declare a cache hit (Decision 600), then an overall cache miss is declared (Block 603) and re-traversal proceeds, in accordance with prior art.

The history of a node is an ordered collection of history elements, each contributed by a code element during a path traversal leading up to and including the node. A false path is caused by mutually inconsistent history elements in a history, and, in accordance with embodiments of the invention, the false path signature consists of the mutually inconsistent history elements that cause the path to be false. The nature of a code element, the way a history element may be derived from a code element, and the way in which a false path signature may be derived from the history are described in more detail below.

Figure 7:
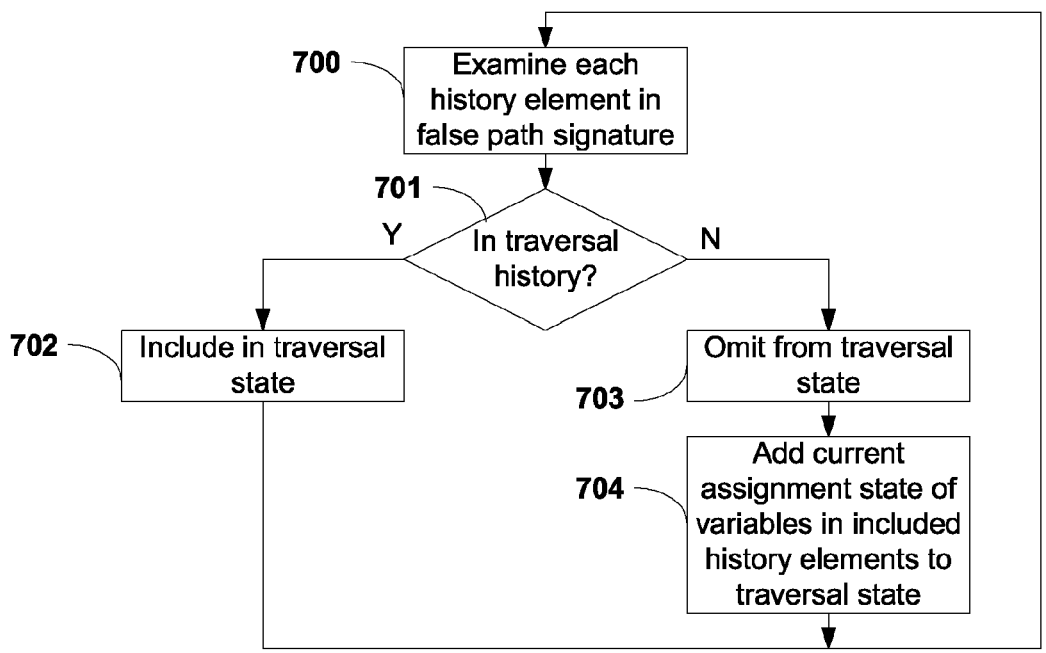
FIG. 7 illustrates an exemplary process for creating a traversal state in accordance with embodiments of the invention.

Annotation of a node with a traversal state, as indicated in Block 405 of FIG. 4, occurs on the first traversal in response to a trigger being found along a false path. The traversal state may consist of one or more history elements from the false path signature and zero or more current assignment states of variables. What constitutes a current variable assignment state is described in detail below. As illustrated in the exemplary process of FIG. 7, when determining the traversal state for a current node being annotated, the history elements in the false path signature are examined with respect to the history of that node along the first traversal (Block 700). Each history element in the false path signature is checked to see if it is contained within the current node's traversal history (Decision 701). Any false path signature history elements that are contained in the current node's history will be included in the traversal state (Block 702). Any false path signature history elements that are not contained in the current node's history will be omitted from the traversal state (Block 703); instead, the current assignment state of any variables in the included history elements will be added to the traversal state (Block 704).

Figure 8:
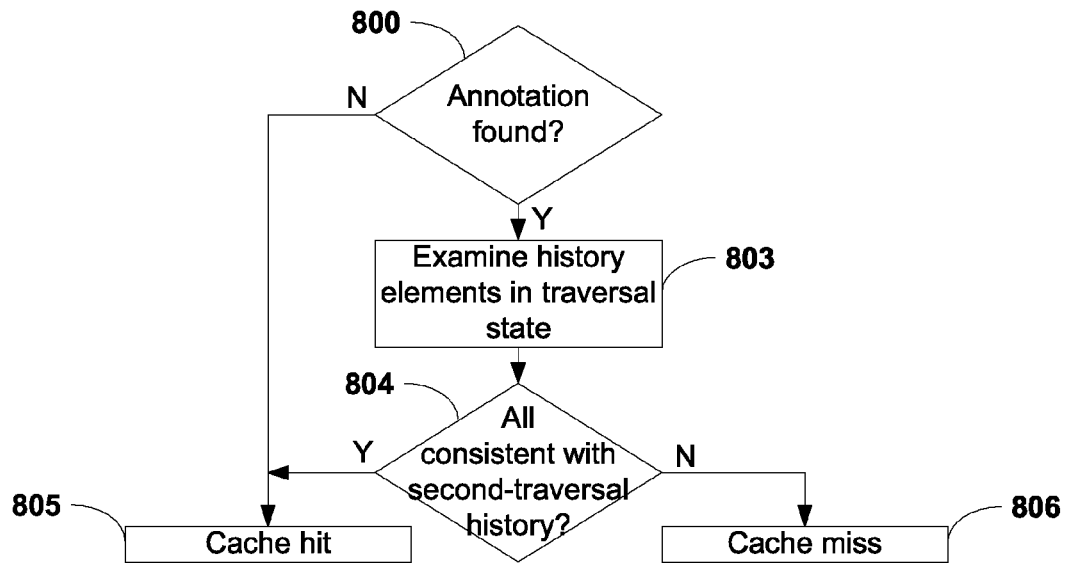
FIG. 8 illustrates an exemplary process for evaluating an annotation as a cache hit or miss, in accordance with embodiments of the invention.

As indicated in Decision 502 of FIG. 5, the traversal state is tested for consistency with the history of the second traversal up to the re-entry node. FIG. 8 provides an exemplary process for testing this consistency. First the node is inspected to determine whether there is an annotated traversal state (Decision 800); if there is no annotation, then a cache hit occurs (Block 805). If there is an annotation, the history elements in the traversal state are examined (Block 803). A check is then made to see if all traversal state history elements are consistent with the history of the second traversal (Decision 804). If so, then a cache hit occurs (Block 805); if not, then a cache miss occurs (Block 806). Consistency of traversal state history elements with the history of the second traversal is described in more detail below.

Figure 9:
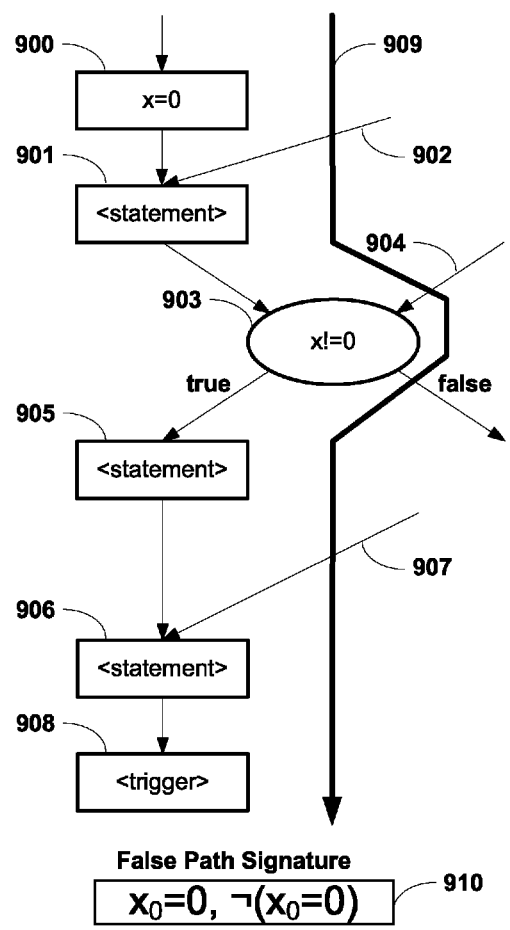
FIG. 9 depicts an example of a path and its associated false path signature.

The process of annotating per the exemplary process of FIG. 4 may be further illustrated through examples. FIG. 9 illustrates an example of a portion of a DAG that will be annotated. Following Path 909, Node 900 contains an assignment of a variable x to 0. Node 901 contains a code statement that doesn't matter for the purposes of this example. This is also a merge node due to incoming Edge 902. Node 903 contains a test of whether the value of x is not equal to zero. This node is also a merge node due to incoming Edge 904. Node 905 contains a code statement that doesn't matter for the purposes of this example, as does Node 906. Node 906 is also a merge node due to incoming Edge 907. Node 908 contains code that constitutes a trigger for the purposes of some checker; the specifics of the checker and the nature of the trigger do not matter for the purposes of this example.

Path 909 contains an assignment of x to 0 in Node 900, followed later by a true result of a test of the value of x being not equal to zero in Node 903. Once assigned the value 0, x cannot test as being not equal to zero, so these two conditions are mutually inconsistent, and Path 909 is a false path. Based on the identification of the trigger in Node 908, false path signature derivation and annotation will proceed per steps 404 and 405 of FIG. 4. False Path Signature 910 is derived in a manner described below, which contains two history elements notated using a logic syntax that is described below. None of the details of notation in the examples, including the use of a comma to indicate separation of the components of the false path signature or traversal states, is intended to limit the invention. Per Block 405 of FIG. 4, annotation takes place on nodes between the trigger and the first enabler node. The first enabler node is the first node in the path contributing a history element to the false path signature. Because Node 900 is the first node along Path 909 contributing a history element to the false path signature, it is the first enabler node. The location of a first enabler node may be noted for future use in a manner that will be known to one of ordinary skill in the art.

Figure 10:
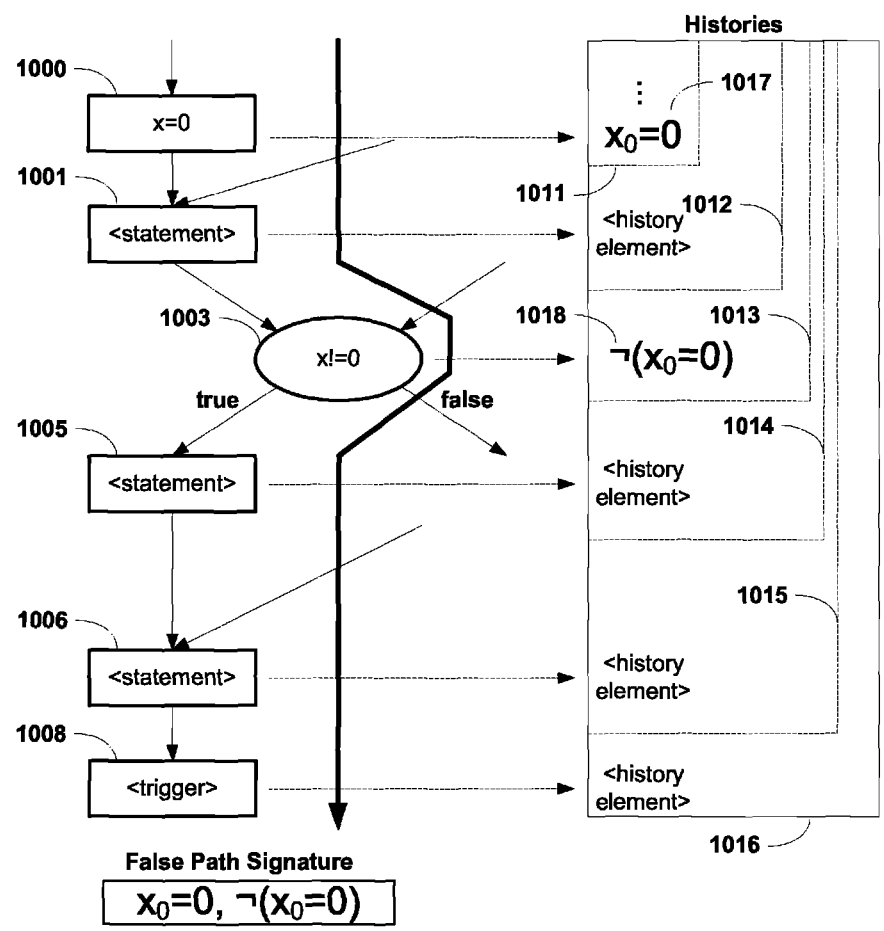
FIG. 10 depicts the histories of the nodes in the example of FIG. 9.

FIG. 10 illustrates the histories of the nodes associated with the example of FIG. 9. Each node has a history, and each node's code element contributes a history element to the history. Where the example does not specify the code in a node, a generic "<history element" is represented in the history, since the code in those nodes and the associated history element do not affect the example.

Node 1000 has History 1011 (the ellipsis indicating that the history will contain any history elements from nodes prior to Node 1000), and contributes History Element 1017. Node 1001 has History 1012 (contributing some history element); Node 1003 has History 1013, and contributes History Element 1018; Node 1005 has History 1014; Node 1006 has History 1015; and Node 1008 has History 1016.

Figure 11:
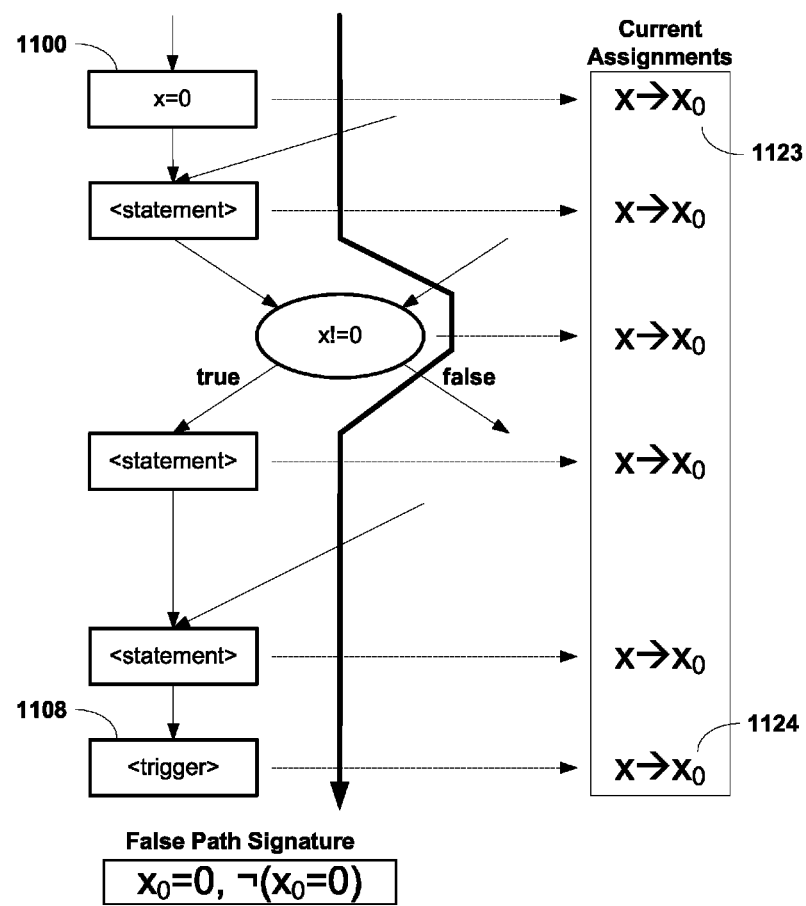
FIG. 11 depicts the current state assignments of the nodes in the example of FIG. 9.

FIG. 11 illustrates the current variable assignments for the example of FIG. 9. The symbol "→" is used to denote the current assignment. Node 1100 has an assignment to variable x, and is given Current Assignment 1123. The specific assignment given assumes for this example that this is the first assignment to x. Because there are no further assignments to x in the portion of the DAG shown, the current assignment remains the same for all subsequent nodes shown, through Current Assignment 1124 for Trigger Node 1108.

Figure 12:
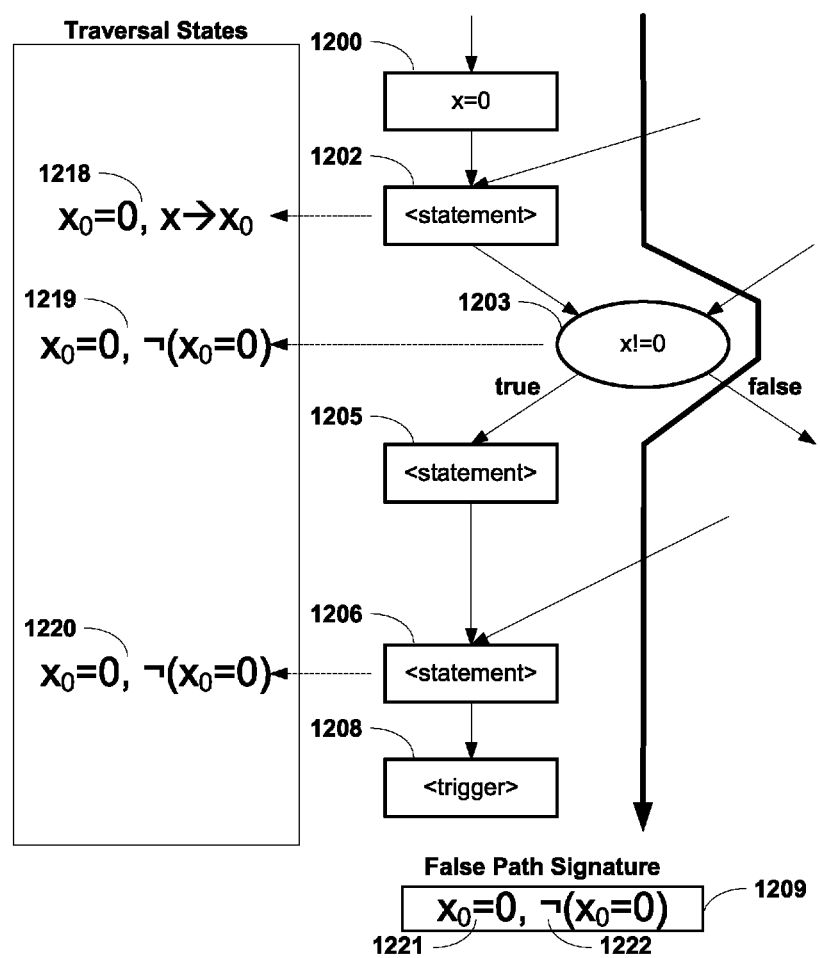
FIG. 12 depicts the traversal state annotations for the example of FIG. 9.

FIG. 12 illustrates the annotations derived from the histories shown in FIG. 10. In this example, annotation starts at the trigger node and proceeds backwards to the first enabler node. Also, for this example, a choice is made to annotate only merge nodes, since only such nodes may ever be re-entry nodes, and only re-entry nodes will be tested on subsequent traversals per Decision 501 of FIG. 5. Other choices, including but not limited to annotation of all nodes or another set of nodes that includes the merge nodes, remain within the scope of the invention. A forwards annotation from the first enabler node down to the trigger node may also be accomplished by means known to one of ordinary skill in the art, including but not limited to maintaining a linked list of pointers to nodes along a current path during the traversal, and then retracing those nodes during annotation. The choice of direction of annotation is not intended to limit the invention.

Node 1208 is not a merge node, and therefore receives no annotation. Node 1206 is a merge node and so is annotated. To annotate Node 1206, the history elements of False Path Signature 1209 are compared to the elements in the history of Node 1206, which is shown as History 1015 in FIG. 10. Because both history elements in the False Path Signature 1209 are within History 1015, both history elements are used in Traversal State 1220 per Block 704 of FIG. 7.

Node 1205 is not a merge node, and therefore is not annotated. Node 1203 is a merge node, and so the components of False Path Signature 1209 are checked against History 1013; both components are a part of that history, so they are used as Traversal State 1219.

Node 1202 is a merge node, so the components of False Path Signature 1209 are checked against History 1012. The History Element 1221 in the false path signature is contained in History 1012, but History Element 1222 of the false path signature is not. Therefore the History Element 1221 is included within Traversal State 1218 per Block 704 of FIG. 7, but History Element 1222 is omitted per Block 703 of FIG. 7, and the current assignment state of x, which is Current Assignment 1124 in FIG. 11, is added to Traversal State 1218 per Block 704 of FIG. 7.

The next two figures illustrate an example of how an embodiment of the invention may be applied to annotate DAGs resulting from programs having loops. The directed graph generated from a loop is cyclic, and the code must therefore be modified to yield an acyclic graph. The specifics of how loops can be unrolled for analysis, and the use of havoc values, will be known to one of ordinary skill in the art, and are not intended to limit the invention. The figures illustrate how the invention can be applied to a program to which unrolling has been applied.

Figure 13:
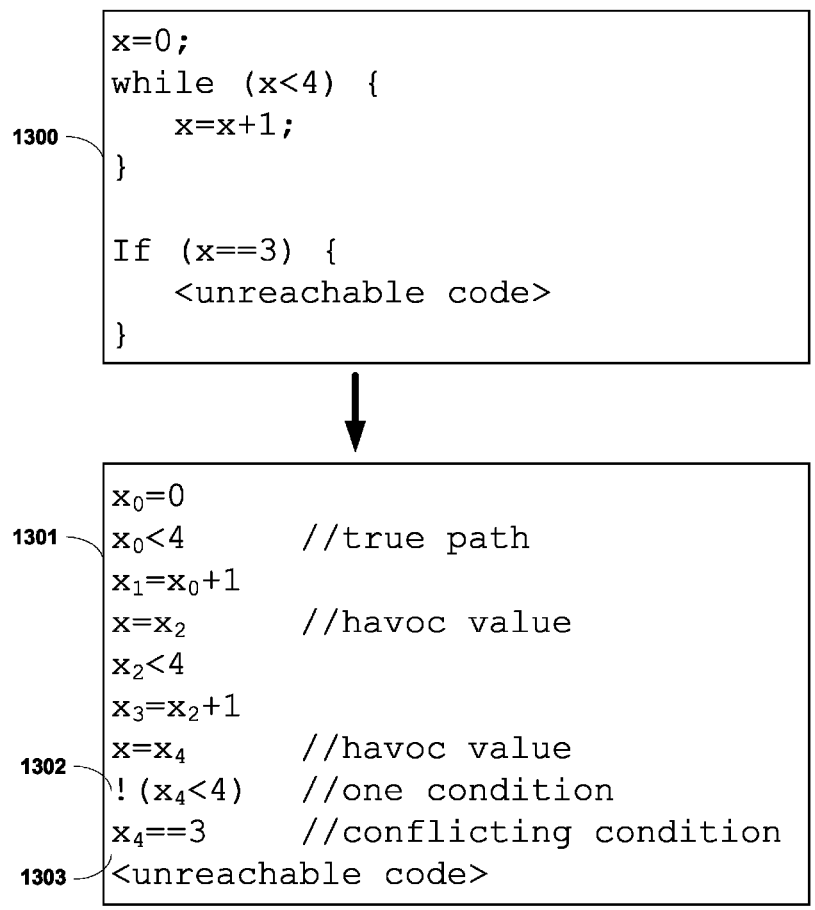
FIG. 13 depicts an example of loop code being unrolled.

FIG. 13 illustrates a C language code snippet before and after unrolling. Snippet 1300 contains a "while" loop upon whose exit the value of x will be 4 or greater. Following the loop is an "if" block that is entered if x is equal to 3. But because x exits the loop with a value of 4 or greater, the "if" condition will never be met, and so the code in its block is unreachable.

Snippet 1301 shows the same code unrolled twice, with havoc values being used to represent potentially unknown data. At the bottom of the snippet are two lines of code that are mutually inconsistent: the exit condition of the loop (Line 1302) and the entry condition of the "if" statement (Line 1303).

Figure 14:
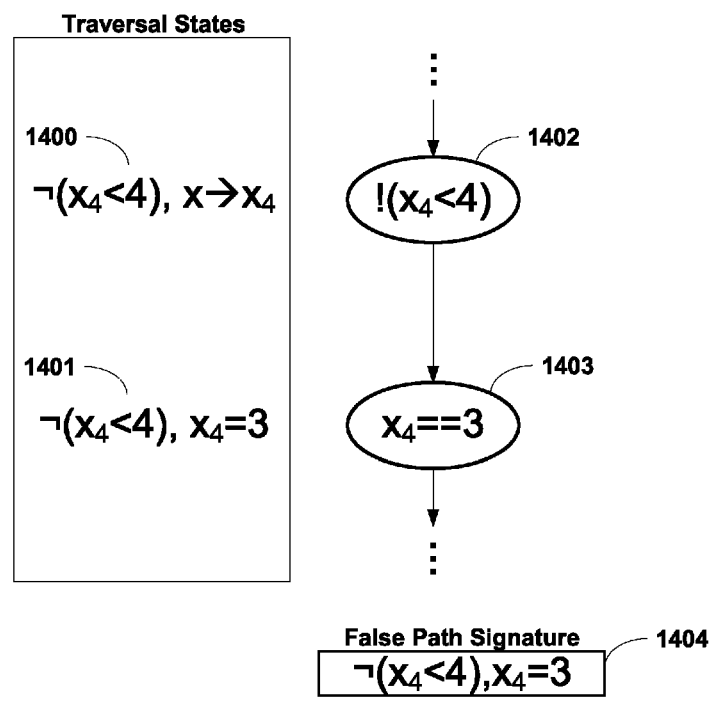
FIG. 14 depicts the graph and annotations for the example of FIG. 13.

FIG. 14 illustrates the relevant portion of the graph resulting from the analysis of Snippet 1301. Here two nodes are shown, Node 1402 representing Line 1302, and Node 1403 representing Line 1303. False Path Signature 1404 is obtained from the mutually conflicting conditions along the path. Therefore Node 1402 is annotated with Traversal State 1400, while Node 1403 will be annotated with Traversal State 1401.

No merge points were shown in this example for simplicity; as noted above, annotation of merge nodes only or annotation of all nodes may both be valid embodiments of the invention. This illustrative simplification should not be construed as being in conflict with other descriptions of embodiments of the invention. Also, for clarity, the program statements resulting from the loop unrolling prior to Node 1402 have been omitted from FIG. 14 since they are not annotated and do not affect the example.

In addition to the kinds of operations illustrated above for embodiments involving program control-flow graphs, the techniques also can be applied to other computing entities, including but not limited to function calls and pointers, as well as abstraction techniques known to those of ordinary skill in the art, including but not limited to the use of uninterpreted function calls. The representation or implementation of any of these or other computing entities are not intended to limit the invention. Adaptation of the invention to these and other entities will be straightforward for one of ordinary skill in the art in light of the description provided here.

Figure 15:
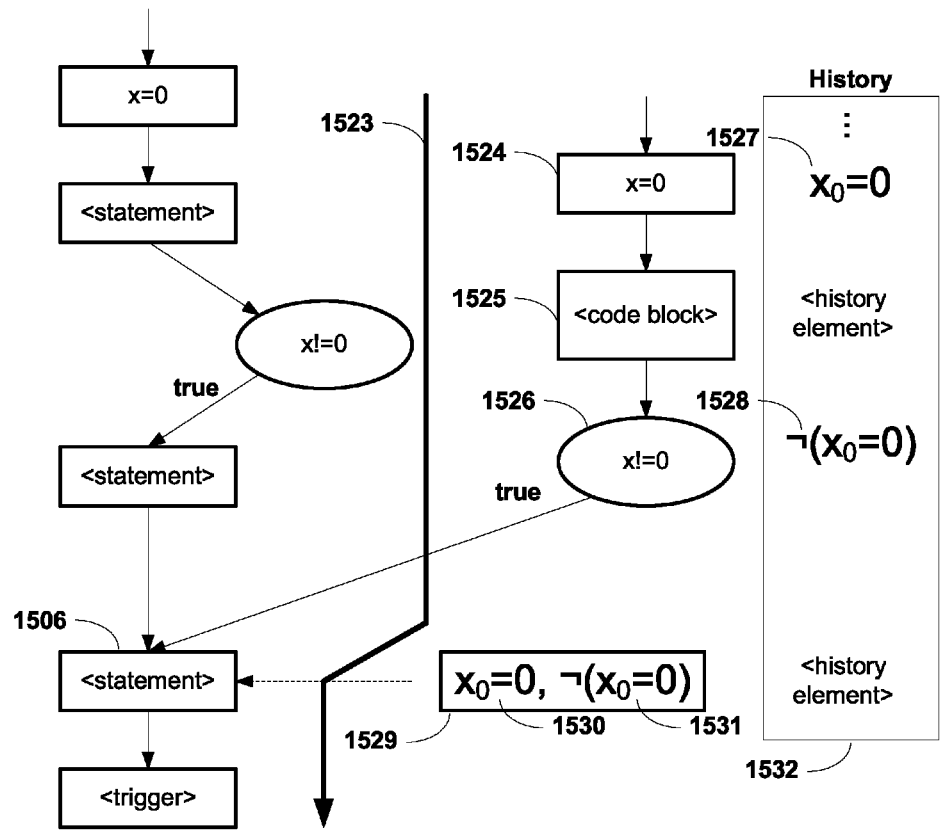
FIG. 15 depicts an example of cache hit evaluation.

The following examples illustrate how traversal states may be tested for cache hits in accordance with the exemplary process of FIG. 5. FIG. 15 illustrates the graph used in the example of FIG. 9, with some nodes from another path added. Specifically, along Path 1523, Node 1524 assigns variable x to zero, followed by a Code Block 1525 that is assumed not to affect the value of x, and then Node 1526 takes the true branch of a test to see whether x is not equal to zero. Path 1523 then proceeds to Node 1506, which is a re-entry node where Path 1523 commences re-traversal of the nodes that were traversed in the example of FIG. 9. For the purposes of this example, we will focus on the Traversal State 1529 that was annotated as Traversal State 1220 of FIG. 12.

The history for Node 1506 along Path 1523 is shown in History 1532. Node 1524 contributes History Element 1527, and Node 1526 contributes History Element 1528. Other history elements are contributed by other code, but do not affect this example. Since no assignments have been made to x after Node 1524, the current assignment of x is $x_0$.

Traversal State 1529 contains two history elements, History Elements 1530 and 1531, and no current assignment states. Per Decision 804 of FIG. 8, both History Elements 1530 and 1531 are consistent with History 1532, as History Elements 1527 and 1528, and a cache hit is declared.

Figure 16:
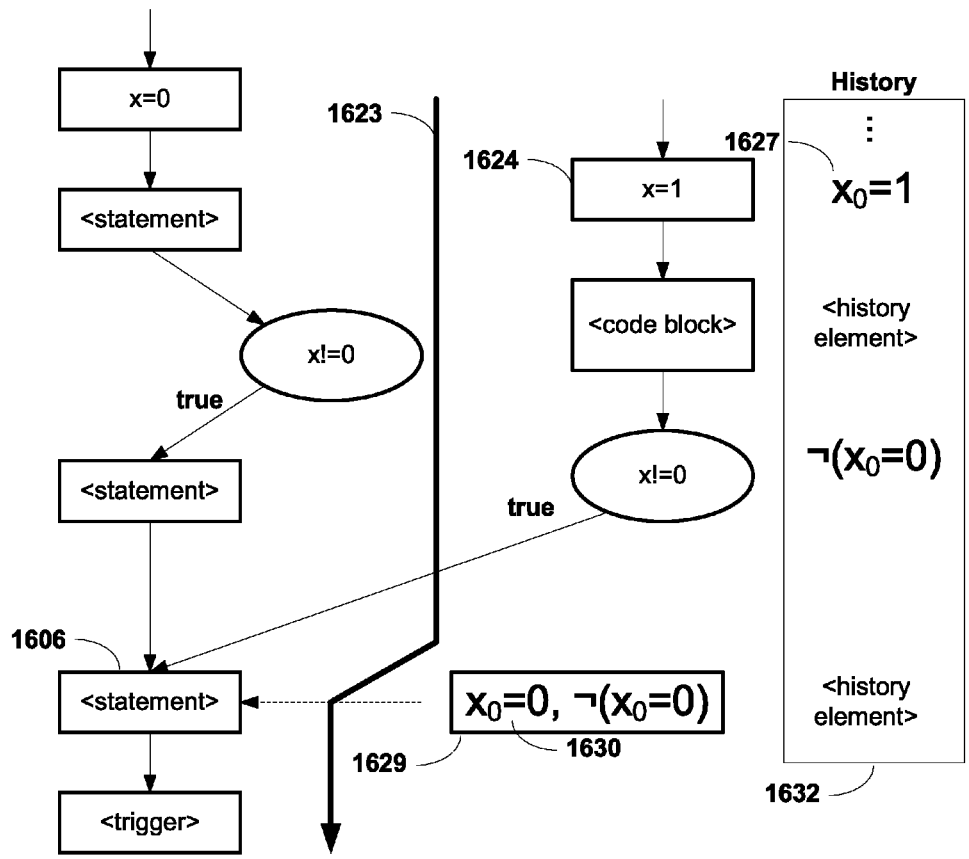
FIG. 16 depicts another example of cache hit evaluation.

FIG. 16 shows a similar example, but here Node 1624 has an assignment of x to 1 instead of 0, contributing History Element 1627 to History 1623 of Node 1606 along Path 1623. Now when checking Traversal State 1629 for consistency with History 1632, History Element 1630 of Traversal State 1629 is not in History 1632, and therefore a cache miss is declared per Decision 804 of FIG. 8.

Figure 17:
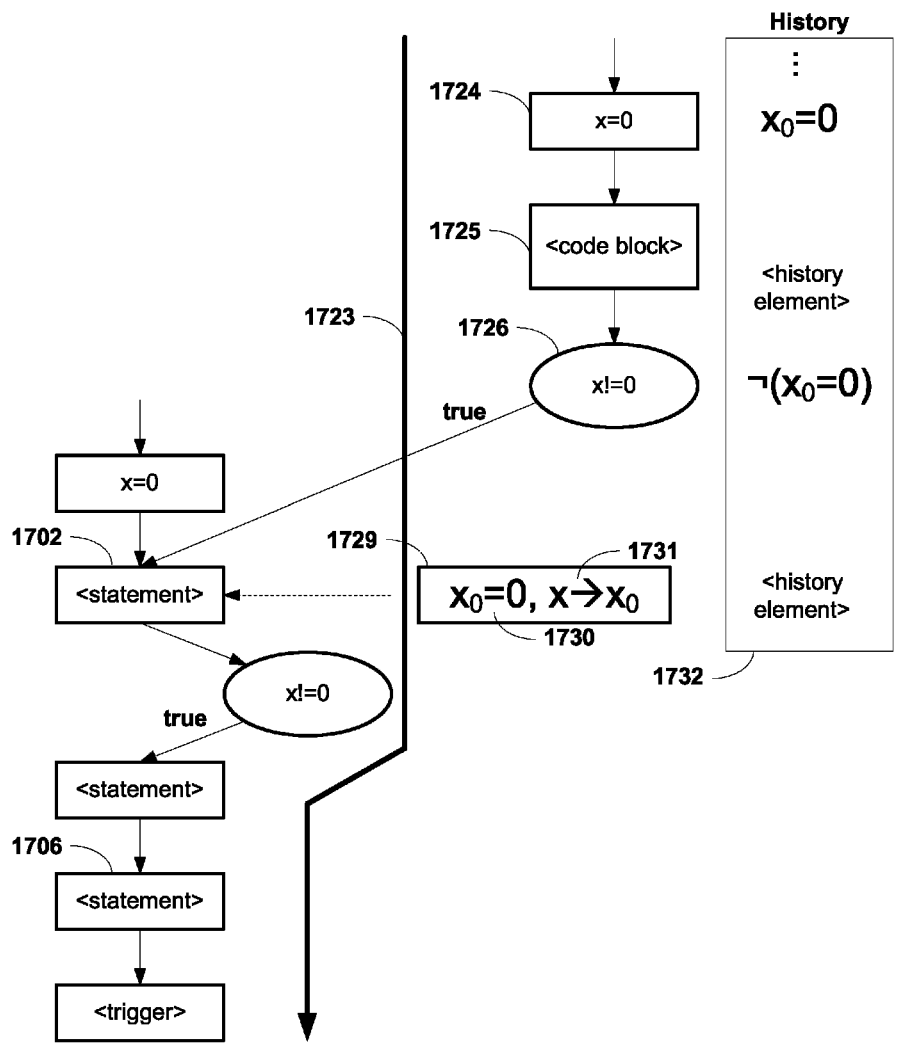
FIG. 17 depicts yet another example of cache hit evaluation.

FIG. 17 shows yet another similar example, except that here the added nodes of Path 1723 (Nodes 1724, 1725 and 1726) merge back into the graph of FIG. 9 at Node 1702 instead of Node 1706, as was done in the prior two examples. Therefore in this example, Node 1702 is the re-entry node, and its annotated Traversal State 1729 (derived as Traversal State 1218 of FIG. 12) is used for cache hit testing. History 1732 remains the same as History 1532 of FIG. 15. As before, the current assignment for x is $x_0$.

Traversal State 1729 consists of History Element 1730 and Current Assignment State 1731. History Element 1730 is in History 1732, and the current assignment state of x for the current traversal is $x_0$; therefore a cache hit results.

Figure 18:
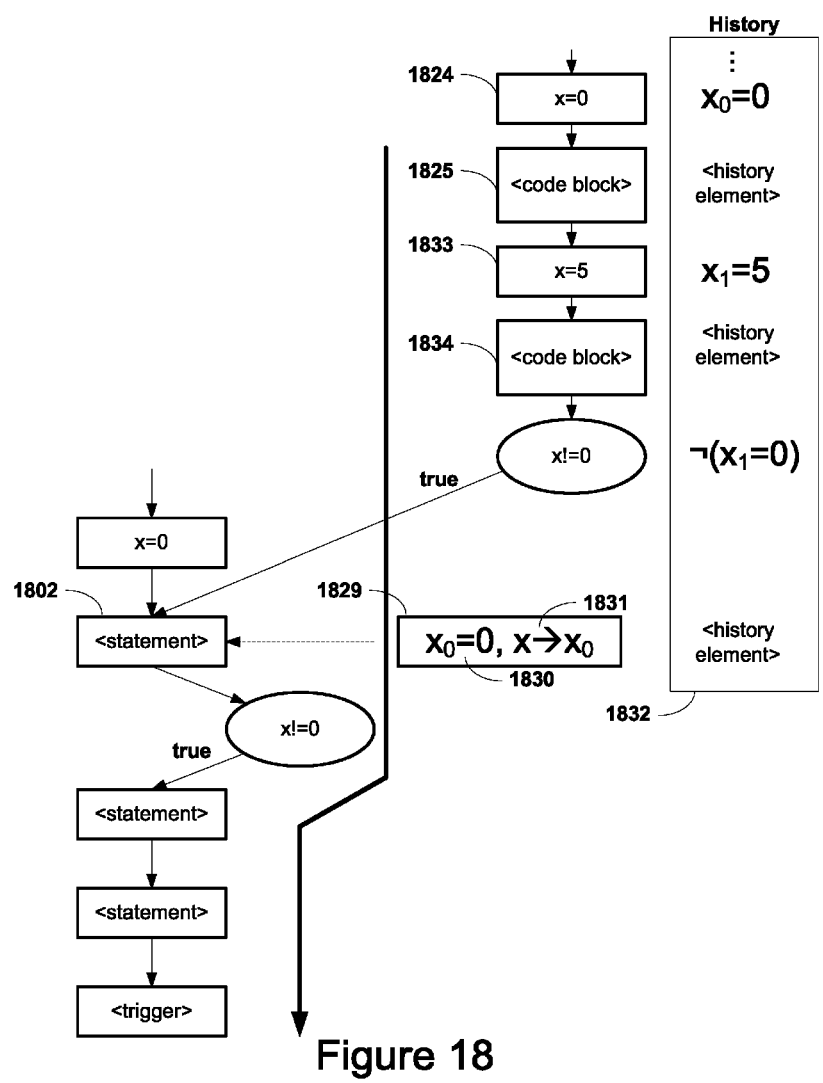
FIG. 18 depicts yet another example of cache hit evaluation.

FIG. 18 illustrates an example where there is an additional assignment to x in the current traversal. Node 1824 again assigns x to 0, followed by a Code Block 1825 that does not affect the value of x. Then there is an additional assignment to x in Node 1833, followed by another Code Block 1834 that is assumed not to affect the value of x. History 1832 of Node 1802 is created as shown. Because of the additional assignment to x, the current assignment of x is $x_1$ in the current traversal.

This time when Traversal State 1829 is tested, History Element 1830 is still found within History 1832, but the Current Assignment State 1831 of $x_0$ is not the same as the current assignment $x_1$, so a mapping is done between $x_0$ and $x_1$. The history element $x_0=0$ is in the history, but the current assignment state of x is $x_1$, per current assignment state 1831, so a cache miss occurs.

Figure 19:
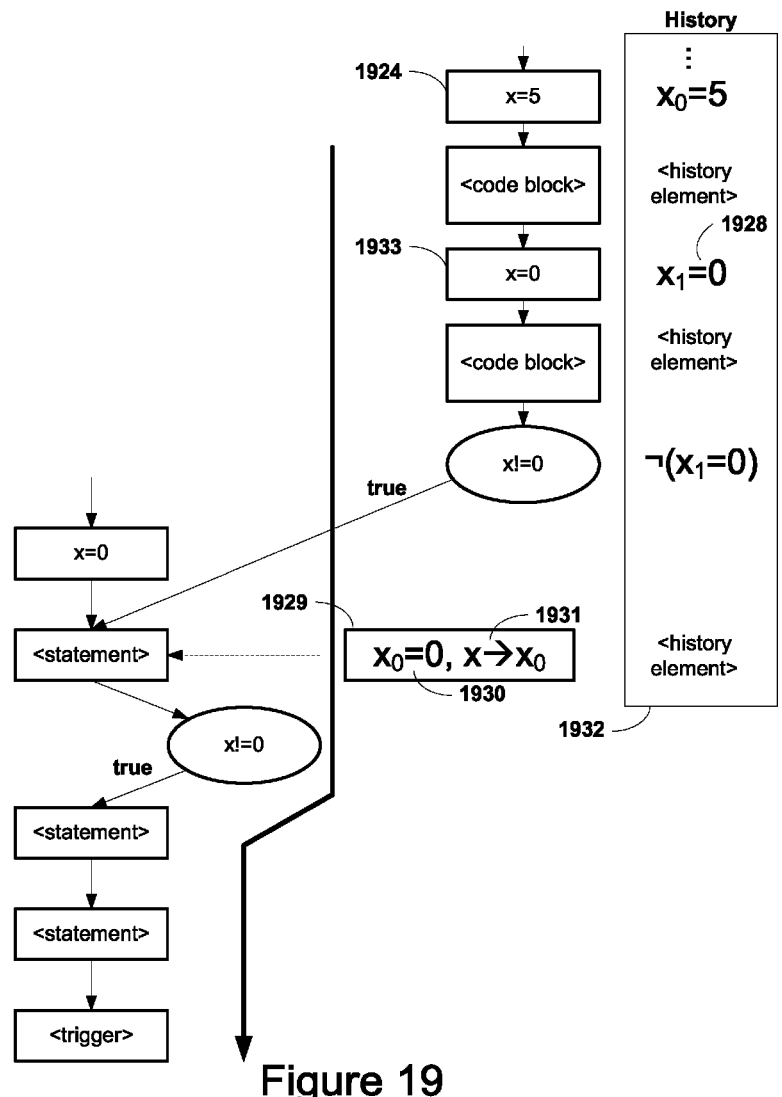
FIG. 19 depicts yet another example of cache hit evaluation.

FIG. 19 illustrates an example that is almost the same as that of FIG. 18, except that the assignments of Nodes 1924 and 1933 have been reversed so that the first assignment assigns value 5 and the second assigns value 0. Now the comparison between History Element 1930 from the annotated traversal state and History Element 1928 from the current traversal history will create a mapping between $x_0$ in the traversal state and $x_1$ in the current traversal as part of the consistency test of Decision 804 of FIG. 8, described in more detail below. Thus Current Assignment State 1931 maps to a current assignment state of $x_1$, matching the current state of the current traversal, so a cache hit occurs.

Figure 20:
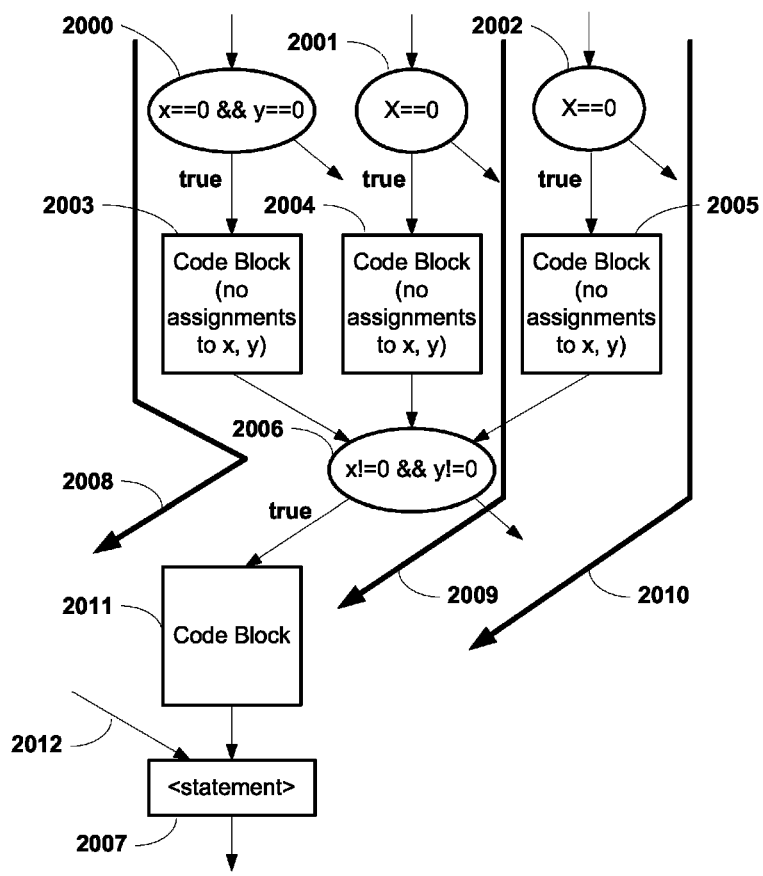
FIG. 20 depicts an example of three merging paths.

The previous annotation examples have illustrated the use of a single annotation on each node. It is possible for multiple annotations to be placed on a node, each being contributed by a different path merging through that node. FIG. 20 through FIG. 23 illustrate both the annotation and cache hit testing of one such example. In order to focus on the multiple annotations, the explicit steps leading to the derivation of false path signatures and traversal states and the steps used when testing for a cache hit are not provided here, being completely consistent with the examples already shown. In FIG. 20, three paths are shown to merge at the point of Node 2006. Path 2008 contains Node 2000 and Code Block 2003; Path 2009 contains Node 2001 and Code Block 2004; and Path 2010 contains Node 2002 and Code Block 2005. Following Node 2006, along the path of a true outcome to Node 2006, all three paths merge into a single path that proceeds to Node 2007 through Code Block 2011. Node 2007 is a merge point due to Edge 2012 joining at that point, and in this example is annotated when a trigger is found somewhere below Node 2007 (not shown).

Figure 21:
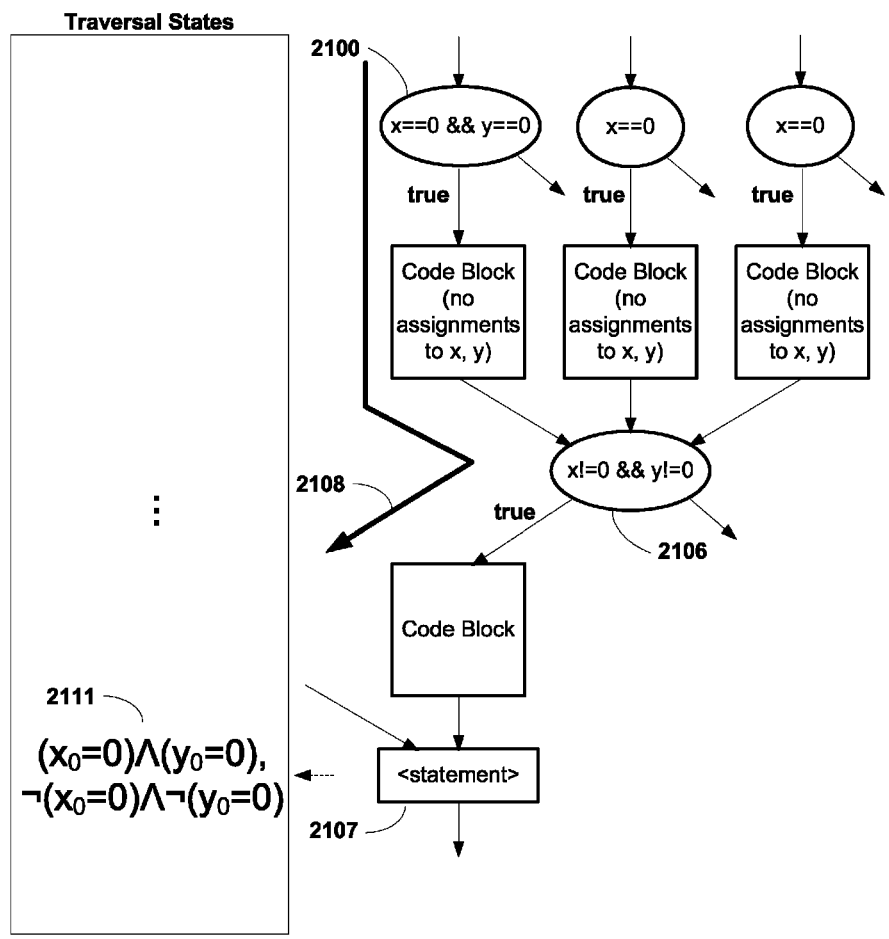
FIG. 21 illustrates the annotations caused by the first path in the example of FIG. 20.

FIG. 21 illustrates the situation while Path 2108 is being traversed. It is assumed that a trigger is found further down the Path 2108 below Node 2107; Path 2108 is flagged as a false path due to the conflict between Nodes 2100 and 2106. The annotation process will then result in Node 2107 being annotated with Traversal State 2111.

Figure 22:
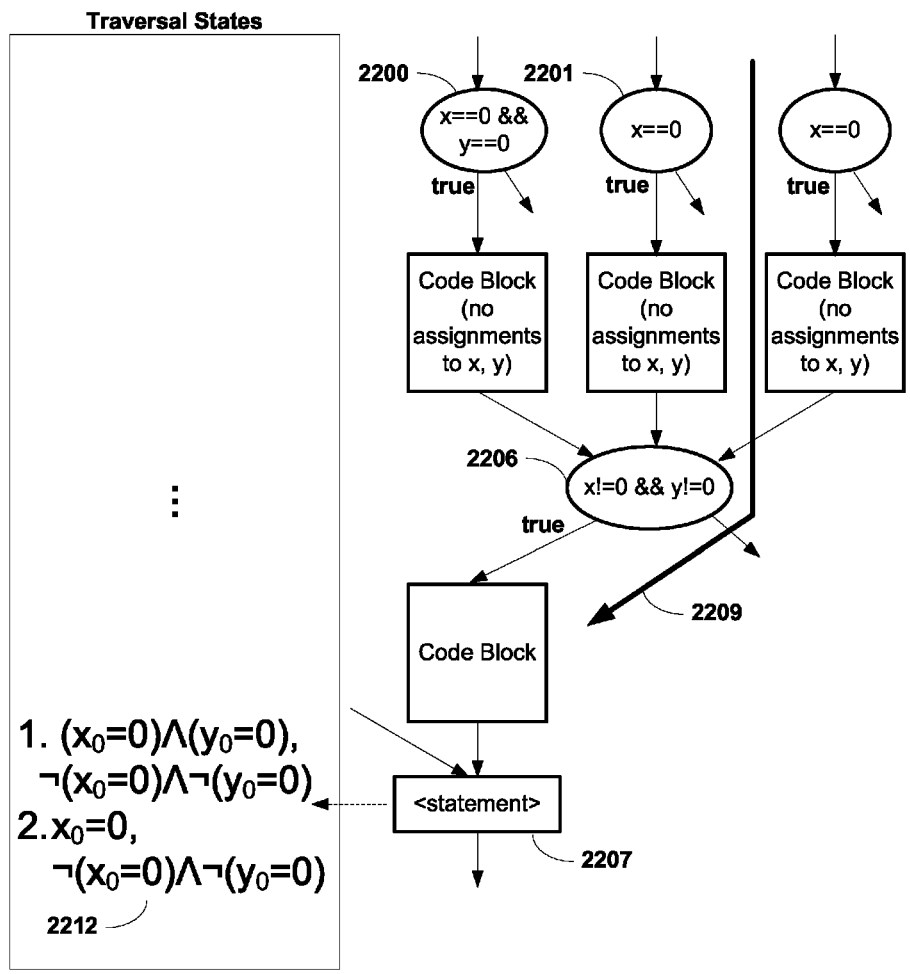
FIG. 22 illustrates the annotations caused by the second path in the example of FIG. 20.

FIG. 22 shows the next step of the scenario, when Path 2209 is traversed. Nodes 2201 and 2206 also conflict, creating another false path. Note that Node 2201 is actually a logical subset of Node 2200 from the prior path, and therefore is theoretically incorporated into the Traversal State 2111 in FIG. 21. However, semantic analysis would be required to split up the AND terms in the annotation, and performance requirements may make that unacceptable as an implementation. The choice of implementation is not intended to limit the invention. Such semantic analysis, if utilized, would employ techniques known to one of ordinary skill in the art in light of the description provided here.

Cache hit testing per the exemplary process of FIG. 8 does not cause a cache hit at Node 2207 along Path 2209, and traversal continues until the trigger is encountered somewhere below Node 2207, at which point Path 2209 is identified as a false path. Annotation then follows, resulting in a second Traversal State 2212 for Node 2207.

Figure 23:
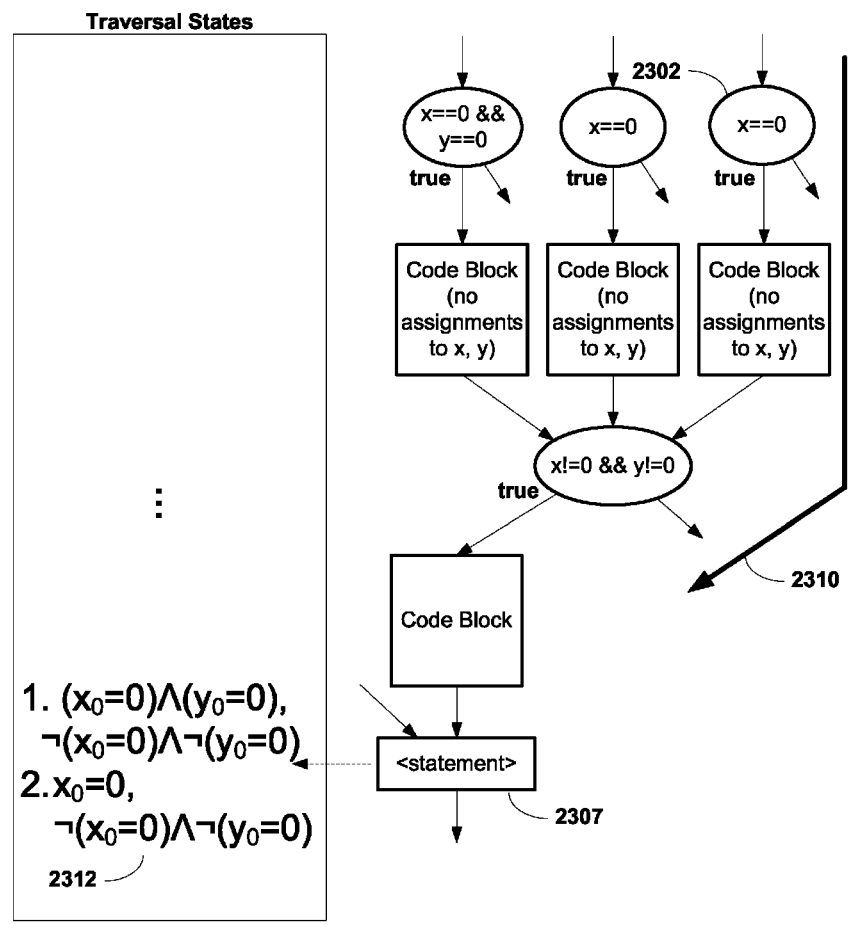
FIG. 23 illustrates the traversal behavior of the third path in the example of FIG. 20.

FIG. 23 illustrates the traversal of the final path, Path 2310. In this case, the history element contributed by Node 2302 allows a match with Traversal State 2312, causing a cache hit at Node 2307; the traversal of Path 2310 is therefore shortened, stopping traversal at Node 2307.

The following descriptions provide yet more detail on background and implementations and embodiments of the invention.

Prior implementations of checkers rely on the checkers alone to determine when a path should be re-traversed. A checker will attempt to traverse all parts of a DAG in order to check for occurrences of defects or other artifacts for which the checker is designed. In order to reduce the amount of time spent traversing the graph, the checker may be designed with the ability to recognize when it returns to a place in the graph where it has been before.

Figure 24:
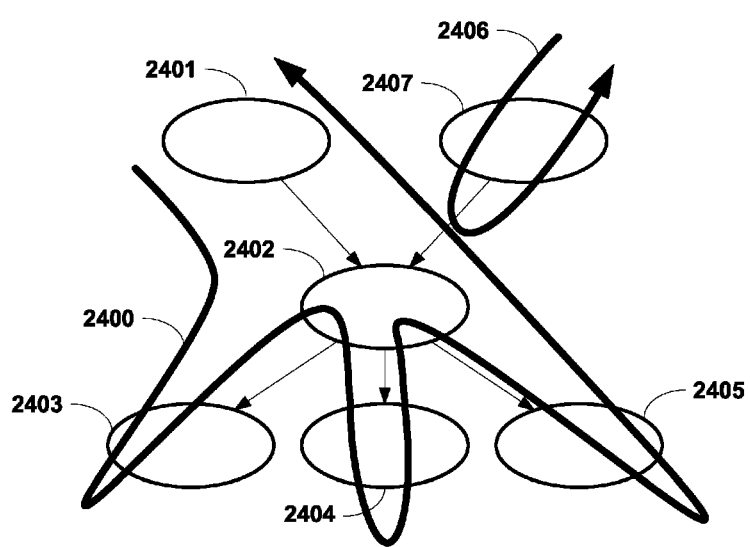
FIG. 24 illustrates a typical depth-first traversal.

FIG. 24 illustrates a depth-first traversal, in which the first edge leading out of a node is traversed on each node visited until no more edges remain. As shown in the figure, Traversal 2400 starts with Node 2401, and traverses the first (and only) edge to visit Node 2402, at which point it traverses the first edge of Node 2402 to visit Node 2403. Because Node 2403 has no more edges to traverse, Traversal 2400 returns to Node 2402 and traverses Node 2402's next edge to reach Node 2404, which also has no edges, causing a return to Node 2402. The next edge of Node 2402 is then traversed to visit Node 2405, which has no edges; traversal returns to Node 2402, and since all edges from Node 2402 have been traversed, traversal returns to Node 2401, which also has no more edges to traverse, and so traversal returns back up to where it started (not shown in this drawing). At some later time, Traversal 2406 visits Node 2407 and traverses its edge to Node 2402. However, Node 2402 has been visited already, and all nodes out of it have been traversed, and so Traversal 2406 can return to Node 2407, which has no other nodes, causing traversal to return back up to where it started (not shown in this drawing). Note that Node 2402 is a merge point, since more than one path intersect there. Such merge points may be a convenient point for determining whether traversal should continue or be halted.

When a checker visits a node, it may not be sufficient simply to determine whether it has visited the node before. It may be useful to record a state on one traversal, and then evaluate on a subsequent traversal whether that node has been visited while in that same state. The choice of what to use to represent the state may have implications on the precision with which false positive defects may be avoided while not missing any valid defects.

Figure 25:
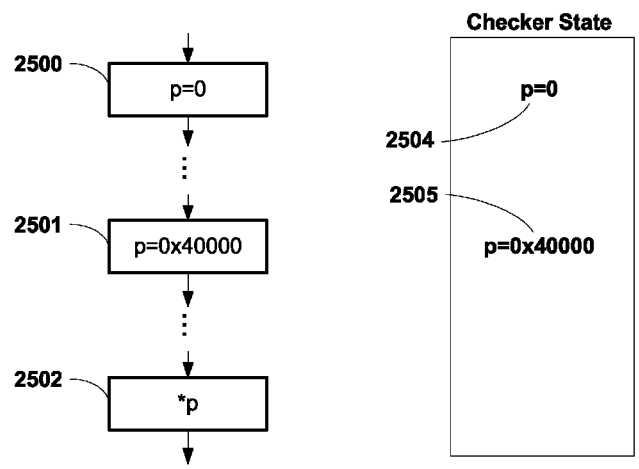
FIG. 25 illustrates the use of a checker state.

The checker may maintain a state, hereinafter referred to as the checker state, that consists of information relevant to the checker. FIG. 25 illustrates an example of a checker maintaining a state. In this example, the checker may detect instances of null dereferencing of pointers. A pointer is an address in memory that may be used in a program; accissing the memory location pointed to by the pointer may be referred to as dereferencing the pointer. It is a common mistake to have a pointer with address zero (or null), and then attempt to dereference the pointer. Such a checker may therefore track the values of pointers and report a defect if the pointer is dereferenced while its value is zero. In FIG. 25, only those code lines affecting the checker state are shown. At line 2500, a pointer p is assigned the value 0. Here the symbol "=" (equals sign) is used to indicate assignment. This is noted in Checker State 2504. Later in the program, the pointer p is assigned the value 0x40000, which is reflected now by Checker State 2505. Later in the program, pointer p is dereferenced in Node 2502, as indicated by the notation *p. Here an asterisk ("*") prefixing the variable is used to indicate a dereferencing of that variable. Because the checker has maintained its state, it can determine whether the dereferencing is legal or not. In the example shown, the checker state is p=0x40000, which means the pointer is not null, and the dereferencing is not an error.

In the course of traversing a graph, the checker may traverse a portion of the graph in one state and not find any problems. If it returns to the same point in the graph in that same state, there is no need to traverse further, since nothing of interest was found while in that same state on the first traversal. However, if traversal returns in a different state, then re-traversing the portion of the graph may be warranted. For example, if the portion of the graph contained a dereferencing of the pointer p, and was traversed while the state was p=0x40000, then no defect would be reported. If that same portion of the graph were visited with the state p=0, it would be necessary to re-traverse that portion since the dereferencing of p would now be a defect, and would need to be detected and reported.

Figure 26:
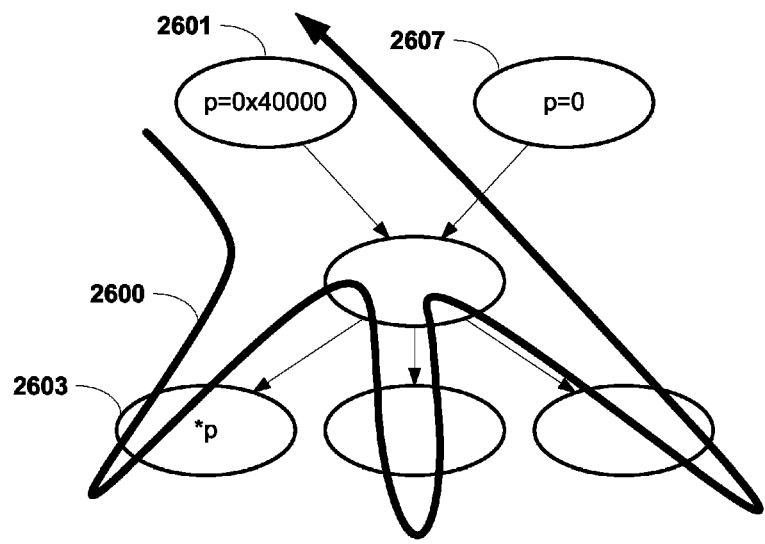
FIG. 26 illustrates a first path traversal for the example of FIG. 25.

This is illustrated in the next two figures. FIG. 26 illustrates the exemplary graph of FIG. 24 above, with Node 2601 having an assignment of pointer p to 0x40000, and Node 2607 having an assignment of pointer p to 0. Node 2603 contains a dereferencing of p. During Traversal 2600, upon passing through Node 2601, the checker state becomes p=0x40000, and when Node 2603 is visited, no defect is noted.

Figure 27:
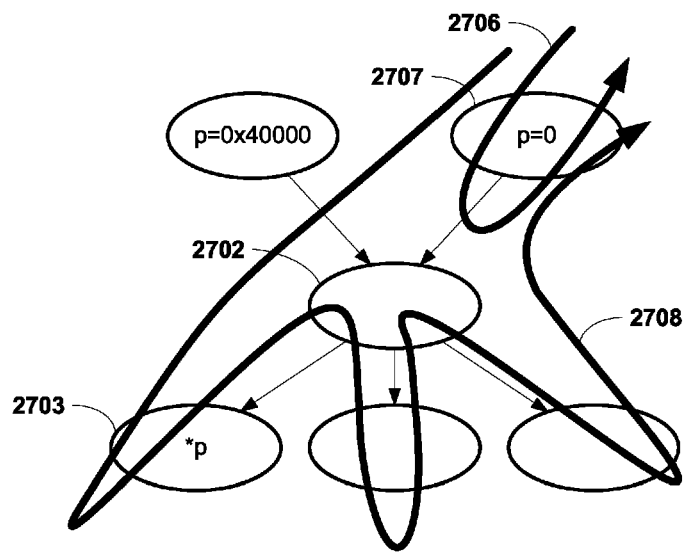
FIG. 27 illustrates second traversals that may be executed for the example of FIG. 25.

In FIG. 27, Node 2707 changes the checker state to p=0. If Traversal 2706 were followed based on the simple observation that all edges below Node 2702 had already been traversed, then Node 2703 would not be re-visited, and the fact that p was dereferenced while equal to zero would be missed, which would typically constitute a failure of the checker. Therefore it is not enough to halt re-traversal simply on the basis of having visited the node before; it is important to consider the state. Therefore the operative decision is whether or not the node has been visited while in a given state. If the state is considered, then upon reaching Node 2702, re-traversal will not be halted because the state during the current traversal is different from the state during the prior traversal, and therefore Traversal 2708 will be used, in which Node 2703 will be visited, and the null dereferencing of p detected.

During a traversal, when an annotation is encountered, if the checker detects that the annotated state matches the current state, a cache hit is said to occur, and re-traversal is halted. If the cached state does not match the current state, a cache miss occurs, and re-traversal proceeds.

If a defect or other artifact of interest is found on a false path, it is not useful to report it because the defect or artifact could never occur in actual execution, and the report would then be a false positive. Therefore, prior to reporting a defect or artifact, a check may be made to verify whether the path being traversed is a false path. Detecting false paths may be a time-consuming procedure, so a graph may not typically be analyzed for all possible false paths. The issue of a false path may be relevant only if false positives are to be avoided, and therefore false path detection may be limited only to those situations where a trigger has been identified.

Figure 28:
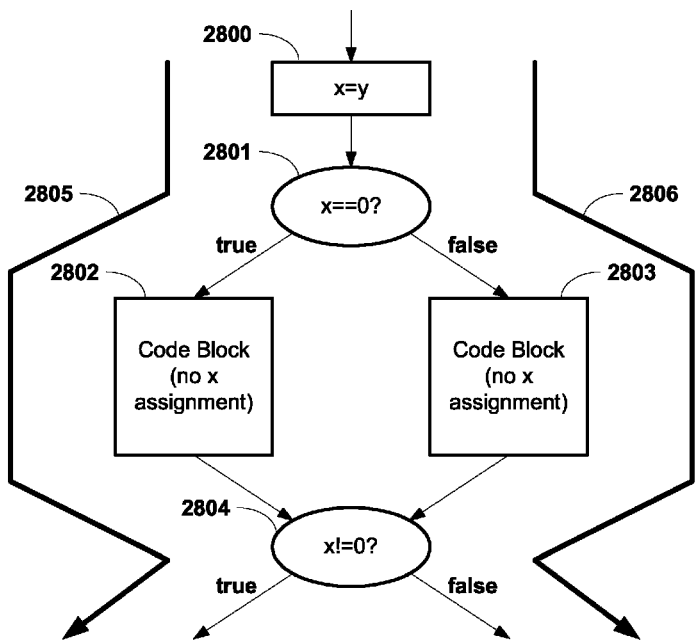
FIG. 28 illustrates two examples of false paths.

A false path is caused by mutually inconsistent conditions along the path being traversed. FIG. 28 provides an illustrative example of false paths. It depicts a portion of a DAG that represents a control-flow graph for a computer program. In this and subsequent examples, C language syntax will reflect the following: "=" (equals) represents assignment; "==" (two equals signs) represents testing for equality; "!=" (exclamation point and equals sign) represents testing for inequality; "&&" (two ampersands) represents logical ANDing, and "||" (two vertical bars) represents logic ORing. The use of C language notation is for illustrative purposes only, and is not intended to limit the invention. Embodiments of the invention may be created for any programming language by one of ordinary skill in the art with respect to that language in light of the description provided herein.

The figure shows an assignment to variable x of the value contained in variable y (Block 2800). Following that, the value of x is tested to see if it equals zero (Decision 2801). Depending on the results of the test, execution will pass either through Block 2802 or Block 2803. In this example, the value of x is not altered in those code blocks, so that the result of the test in Step 2801 remains valid after the execution of either block. After the code blocks, the value of x is again tested to see if it does not equal zero (Step 2804). The flow will continue on one of the resulting branches depending on the results of the test.

Because the comparison of x to zero was made in Step 2801, and no further changes to x were made in the next code blocks, the outcome of the test in Step 2804 is predetermined; if "equals zero" was true in Step 2801, then "not equals zero" will be false in Step 2804, and if "equals zero" was false in Step 2801, then "not equals zero" will be true in Step 2804. Therefore Path 2805, which indicates a true result for both steps 2801 and 2804, could never be taken, and is a false path. Likewise Path 2806, which indicates a false result for both Steps 2801 and 2804, is also a false path.

Figure 29:
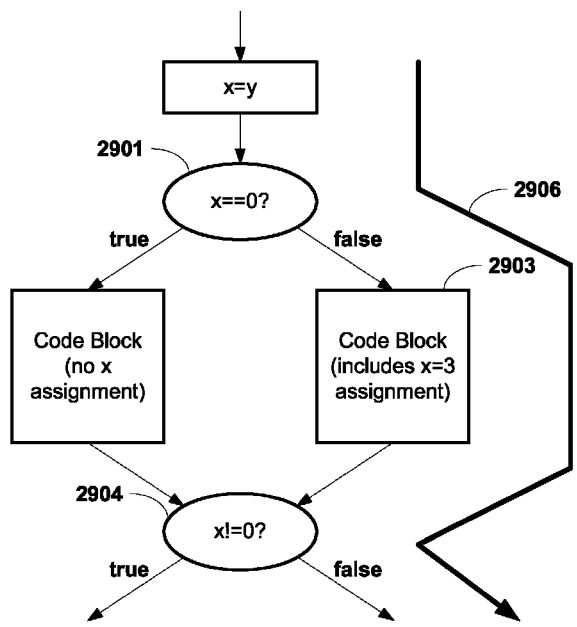
FIG. 29 illustrates an example of a path that is not false.

Another example is shown in FIG. 29. In this case, Code Block 2903 includes an assignment that sets the value of x to 3. Because the value of x has changed, the impact of the test of the prior value of x for zero value in Step 2901 is no longer relevant. However, following the assignment to 3, the value of x is again tested for inequality with zero (Step 2904). This test must always be true, thus making Path 2906 a false path.

Figure 30:
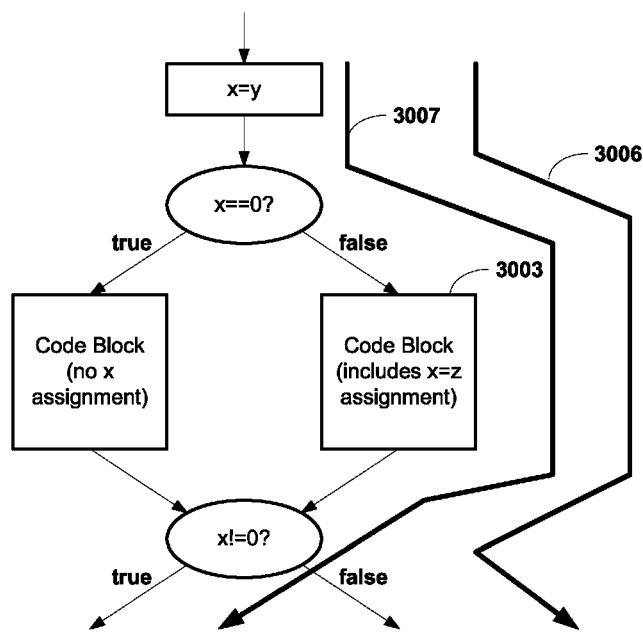
FIG. 30 illustrates two examples of paths that are not false.

FIG. 30 shows yet another example similar to that of FIG. 29, except in this case the assignment to x in Code Block 3003 is not to a constant, but to another value contained in variable z. If the value of variable z is not known without executing the program, then the results of the evaluation of x!=0 is not known until the program executes, so neither Path 3006 nor Path 3007 is a false path. During execution, values may be assigned to x and z that make one of the paths false, but this dynamic characteristic cannot be comprehended by a static analysis tool. If there exists at least one condition under which a path may be traversed, it may not be considered a false path.

Figure 31:
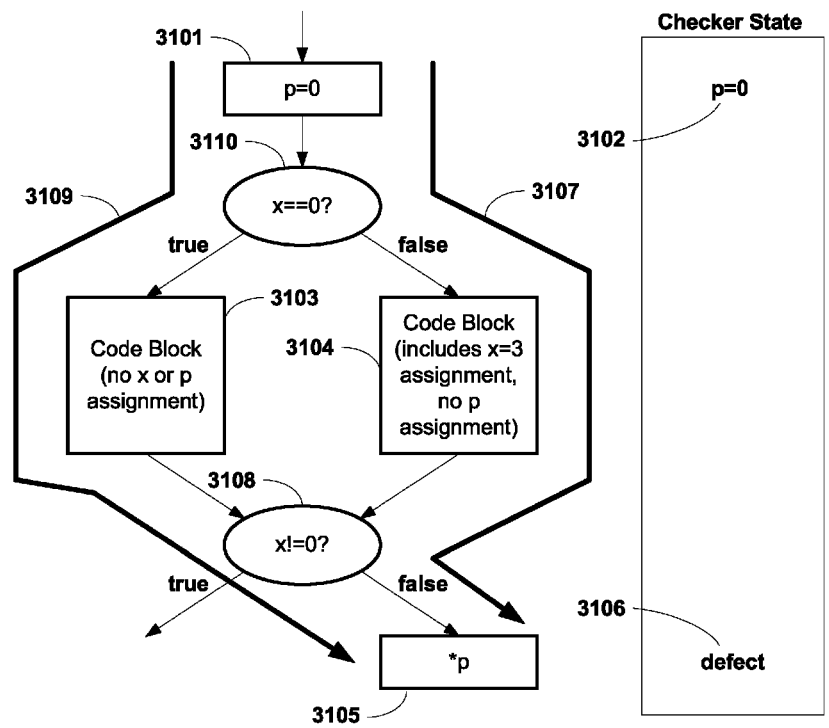
FIG. 31 illustrates the use of checker states relative to false path identification.

FIG. 31 illustrates an exemplary application of the checker state maintained by a checker looking for null dereferences using a program snippet equivalent to that represented by the DAG shown in FIG. 29. In Code Block 3101, variable p is assigned the value 0, and the checker state 3102 reflects this. The execution of code may now flow through either Code Block 3103 or 3104; in neither block is the value of p changed, so the checker state does not change as a result of either of those blocks. If the x!=0 test fails after passing through Block 3104 along Path 3107, then variable p is dereferenced. Because the value of p is still 0, as recorded by the checker state, this represents a Defect 3106, and therefore a trigger, and may be reported by the checker. This causes a false path test of Path 3107. Path 3107 in this figure is the same as Path 2906 in FIG. 29, and that path was shown to be false, so the false path test resulting from the trigger will indicate that Path 3107 is false, meaning that when executing along Path 3107, the observed defect could never occur. Reporting this defect would be a false positive, and so reporting of this defect would be suppressed. Having traversed that path, the checker state may be noted on Node 3110, indicating that the node has been visited with checker state p=0. Further traversals while in that state would therefore be suppressed.

However, along Path 3109, which is a true path, the defect could occur and should be reported. An attempt to traverse that path may encounter Node 3110 annotated with checker state p=0; since the checker state would be p=0 along Path 3109 just as it was along Path 3107, a cache hit would occur, and no further traversal of Path 3109 would take place. That would cause the defect to be missed, which would typically be considered a failure of the checker.

The failure to detect the defect arises from the fact that the checker state used for caching provides no indication of whether or not a false path existed. In the example of FIG. 31, the checker state relates to pointer p, but the false path arises as a result of tests of the value of variable x. The checker state may, for any given checker, vary widely in its definition, and may in no way be assumed to correlate with the validity of any paths being traversed.

The use of a separate traversal state by the FPP provides for more accurate cache testing with respect to false paths, while allowing the checkers to maintain their own states for the purposes of analysis. The traversal state is derived from a traversal history in a manner to be described below, and is annotated on a node per Block 405 of FIG. 4; this annotation will be compared with a traversal history for cache hit testing Decision 502 of FIG. 5. A history will herein refer to an accumulation of all events along a path traversal, whether related to items of interest to a checker, or to an FPP, or to both, or to neither. These events are be referred to herein as "history elements."

Figure 32:
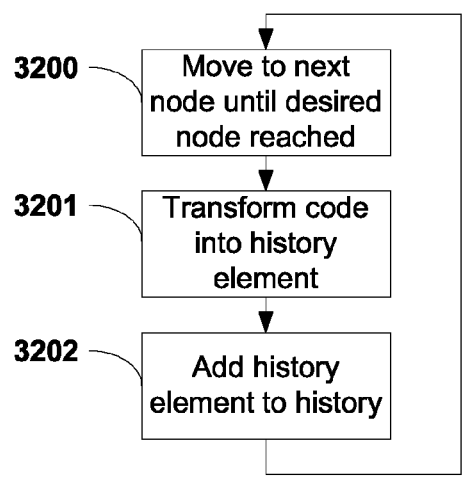
FIG. 32 depicts an exemplary process for creating a traversal history.

FIG. 32 illustrates an exemplary process for creating a history for a node in accordance with prior art. First, each node is traversed starting from the beginning of the path until the desired node is reached (Block 3200). At each node, the code is transformed from the programming language syntax into logic syntax (Block 3201) in a manner that will be known to one of ordinary skill in the art in light of the description provided here. Then the history element is added to the history (Block 3202).

The history of a traversal reflects code elements that exist in the program along that traversal. A code element may be either an assignment, wherein a variable is assigned a value, or a truth decision, wherein the truth of a logical expression is evaluated as either true or false. Note that truth decisions that appear to have more than two outcomes, such as case statements, may be decomposed into multiple truth decisions, each having only two outcomes, by one of ordinary skill in the art in light of the description provided herein. In many programming languages, a code element may be a single line of code; in other programming languages, multiple code elements may be found on a single line of code. Certain examples provided herein may make reference to a line of code; this should be interpreted in the context of each line of code consisting of a single code element, and in such examples a line of code is the same as a code element.

Each history element is derived from a code element, and therefore may reflect either an assignment or a truth decision. An assignment consists of an "assignee," which receives the assigned value, one or more operands, whose values participate in determining the value to be assigned, and one or more operators, which determine how the operands are combined to determine the value to be assigned. As an example in the C language, the assignment x=2*y+z has x as assignee, a constant 2 and two variables y and z as operands, and two operators, "*" (indicating multiplication) and "+" (indicating addition). A truth decision evaluates the truth of a logical expression, and may consist either of one or more logical operands and one or more logical operators, or a logical relation between comparands, consisting of the comparands and a logical operator, each comparand consisting of one or more operands and one or more arithmetic, logic, or other operators. A logical operand is a variable or constant that can have the logical values true or false. A logical operator may alter the truth value of a logical operand. An example of the first type of logical expression in the C language is !x, where an exclamation point ("!") is a logical operator indicating logical negation, and x is a logical operand. An example of the second type of logical expression in the C language is x==2*y+z, where one comparand consists of a single operand x, the other comparand has operands 2, y, and z, and operators * and +, and the logical relation is "is equal to".

Figure 33:
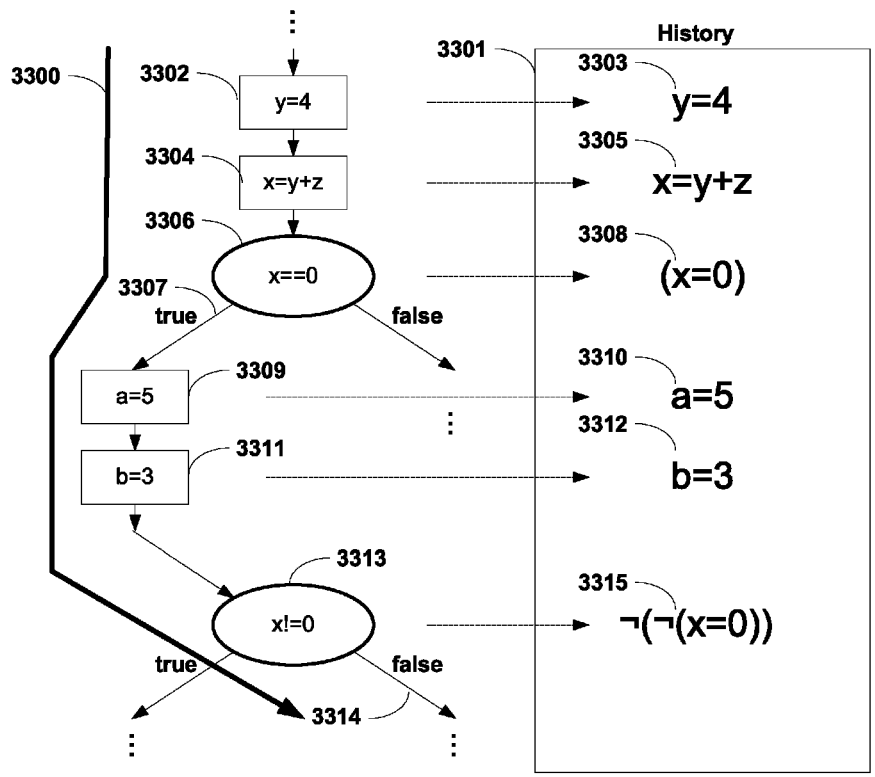
FIG. 33 depicts an example of a traversal history.

An example history is shown in FIG. 33. In this example, traversal of Path 3300 results in History 3301. Each code element contributes a history element to the history. So Code Element 3302 contributes History Element 3303 and Code Element 3304 contributes History Element 3305. Code Elements 3302 and 3304 represent assignments. Code Element 3306 represents a truth decision, where the value of x is compared to 0. Path 3300 takes the segment reflecting the true value of that decision, as indicated by Edge 3307. The history element contributed by a truth decision must reflect not only the nature of the decision, but also the result of the decision along the path being traversed, in this case, the true result. The parentheses around History Element 3308 are used here to indicate this true value, essentially through the absence of negation.

Along the path shown, Code Element 3309, an assignment, contributes History Element 3310, and Code Element 3311, also an assignment, contributes History Element 3312. Code Element 3313 is another truth decision, and the false result along Edge 3314 is followed, contributing History Element 3315, which contains a logical inverter indicating the false result. Because History 3301 contains history elements through Code Element 3313, this history reflects the history for the node of Code Element 3313 along this path. Note that the history of each node will be different, reflecting only history elements added up to and including that node, and the history for a node will be different for different paths used to reach that node.

The transformation of Line 3313 into History Element 3315 may be understood more clearly first by describing the notation and then the process of creating the history element. The form of the history elements may conveniently be placed in a format that is independent of the specific programming language being used. This may also make the history amenable to further processes to be described in detail below.

For the logic syntax used in the history, "=" (equals) represents a test for equality; "¬" represents the logic NOT or inversion function; "∧" (like an inverted sans serif V) represents the logical AND function, and "∨" (like a sans serif V) represents the logical OR function. While the notation for the logic syntax is detailed here for clarity, the transformation of a given programming language into logic syntax will be known to one of ordinary skill in the art in light of the description provided here. Alternative logic syntax choices may be used without exceeding the scope of the invention.

The truth decision of Code Element 3313 contains two comparands, the variable x, and the constant value 0. The logical relation used is the "not equals" relation. While in the C language this relation is indicated by the single operator "!=", in the logic notation used in this example for the history element, the "not" portion of the relation is separated from the "equals" portion; that is, "not equals" is transformed into "not" "equals" as two separate operations. This transforms x!=0 (x not equals 0) into ¬ (x=0) (not (x equals 0)). Since the false result of the decision is being traced, an inverter is added, yielding ¬ (¬ (x=0)).

Figure 34:
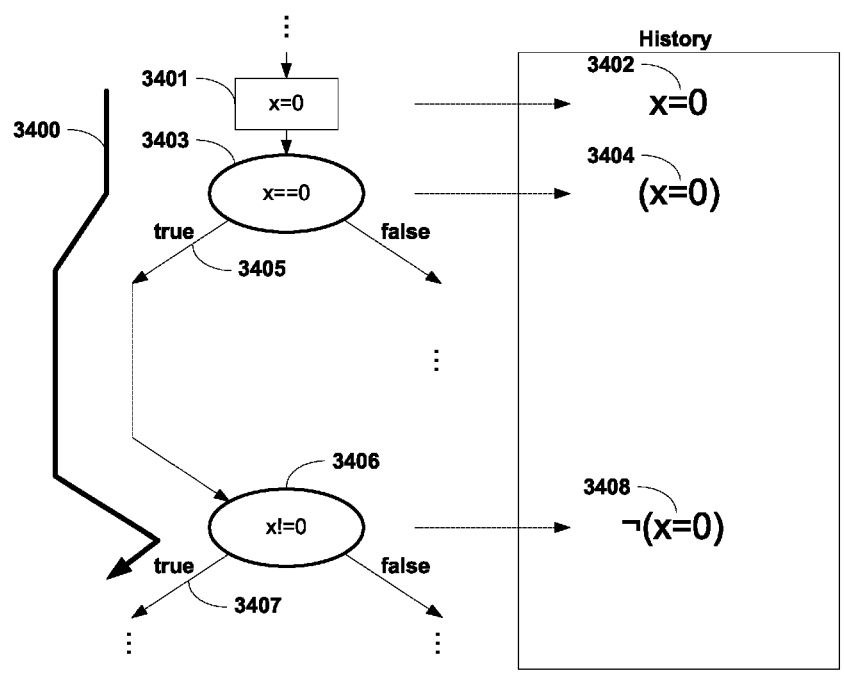
FIG. 34 illustrates the history elements for a false path.

While the history as shown in the prior example illustrates the basic notions of history creation, it is inadequate in that different assignments of variables cannot be distinguished. Distinguishing specific assignments is important when deciding whether a path is false or valid. This may be illustrated through an example. FIG. 34 shows a Path 3400 being traversed. An assignment of value 0 is made to x in Code Element 3401, resulting in History Element 3402. A truth decision is then made in Code Element 3403, comparing x to 0, and the true result along Edge 3405 is taken, resulting in History Element 3404. No further changes to x occur along the path, and at a later point, another truth decision on Code Element 3406 tests whether x is not equal to 0, and traverses the true result on Edge 3407, yielding History Element 3408. Path 3400 is a false path because the truth decisions test for x equal to and not equal to zero, and the true result of both is taken. History Elements 3404 and 3408 are mutually inconsistent; both cannot be true at the same time.

Figure 35:
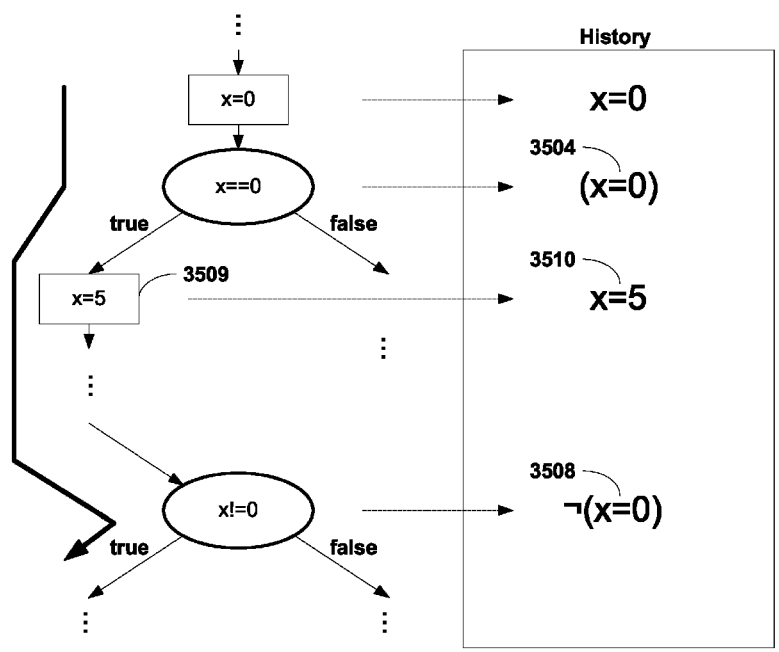
FIG. 35 illustrates the limitations of a history that uses no assignment IDs.

FIG. 35 shows a similar example, except that another assignment to x at Code Element 3509 has been added, contributing History Element 3510. Because the second truth decision is now testing the value of x after it has been assigned to the value 5, this is no longer a false path, since x no longer equals 0. However, History Elements 3504 and 3508 still appear to be mutually inconsistent. This is because as shown, the assignment state of x is not indicated in the history; there is no way of detecting that between History Elements 3504 and 3508, the value of x has changed. As notated, x appears to look the same in each case, and x with one assigned value cannot be distinguished from x with another assigned value. Therefore as Assignment ID is ascribed to x, and to all variables in a history. This provides a way of distinguishing x with the assigned value 0 from x with the assigned value 5 in the example above. Each time an assignment is made to a variable, an assignment ID is added to the variable and incremented. A variable with an assignment ID thus represents that variable in a particular state of assignment. This may be thought of as analogous to "time-stamping" the variable at the time of assignment. At any given time, for a given variable, an assignment ID is considered "current," and a subsequent assignment will make a new assignment ID current.

Using a subscript is one way to implement an assignment ID. Other methods, including but not limited to concatenation with strings, subscripting with a line number corresponding to the assignment line, and using literal subscripts, may be used without departing from the scope of the invention. The notion of "incrementing" the assignment ID will vary according to the implementation; as non-limiting examples, where numbers are used, they may be incremented or the next in an appropriate series may be assigned; where literals are used, they may proceed according to a natural alphabet. The phrase "assignment ID" will be used hereinafter to represent the general practice of marking the assignment state of a variable. Subscripting will be used as a non-limiting exemplary way of illustrating a method of providing an assignment ID.

Figure 36:
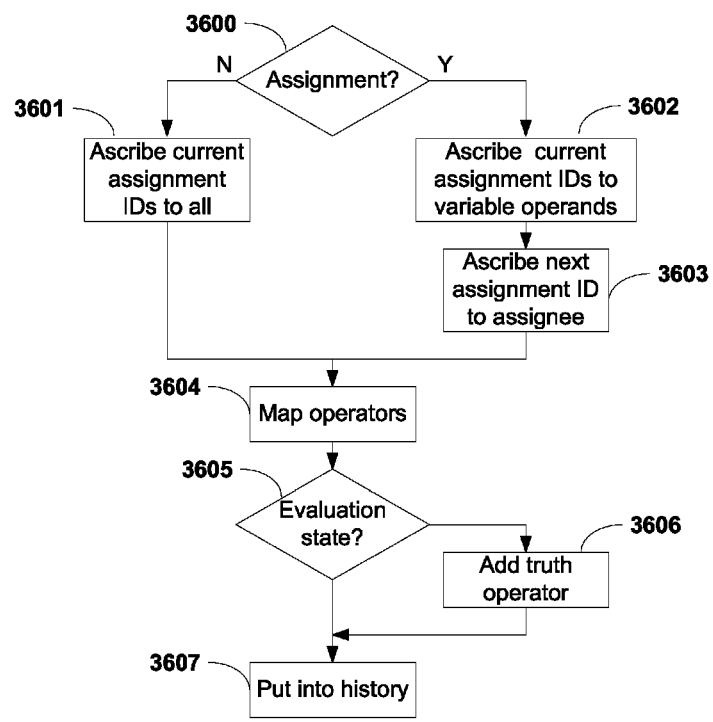
FIG. 36 depicts an exemplary process for transforming a code element into a history element.

FIG. 36 illustrates an exemplary process for transforming the programming language syntax into logic syntax in Block 3201 of FIG. 32. The first element in the exemplary process is to determine whether the line of code represents an assignment of a new value to a variable (Decision 3600). If not, then the current assignment IDs for all the variables in the line of code are added to their respective variables (Block 3601). If it is an assignment, then, the current assignment IDs for any variable operands are added to their respective variables (Block 3602). The assignee will receive an incremented assignment ID, and that assignment ID will become current for that variable (Block 3603). Note that if a variable appears as both an operand and the assignee, it will receive the "old" pre-incremented assignment ID for the operand in Block 3602, and the "new" incremented assignment ID for the assignee in Block 3603. The operators are then mapped from the programming language syntax to the logic syntax (Block 3604). If the expression represents the evaluation state of a decision (Decision 3605), then a truth operator is added to reflect which decision path was followed (Block 3606). Finally the history element is placed into the history (Block 3607).

Figure 37:
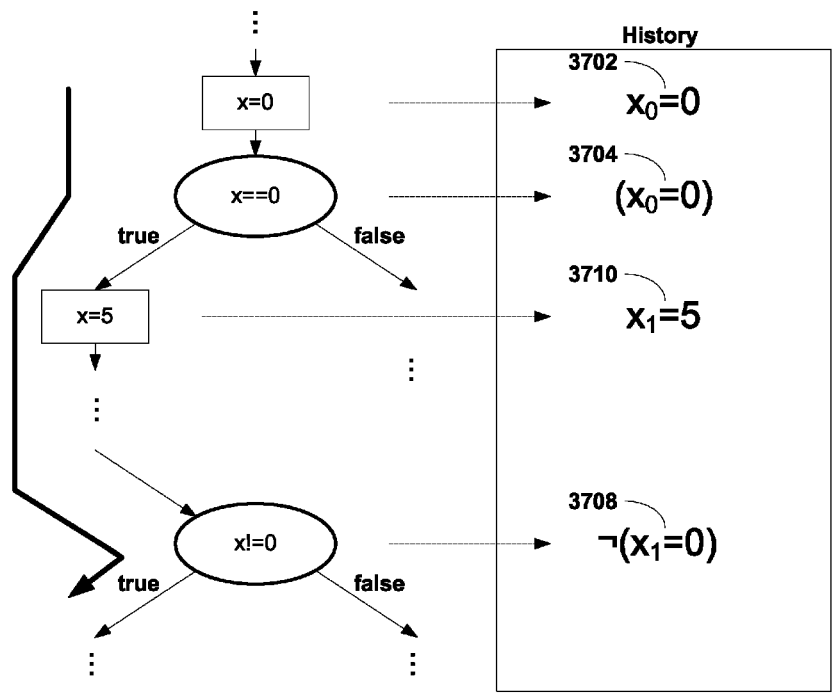
FIG. 37 illustrates the use of assignment IDs.

FIG. 37 shows the example of FIG. 35, but with assignment IDs now used. History Element 3702 shows the variable x subscripted with a 0, assuming this is the first assignment to x along the path. The truth decision of History Element 3704 uses this assigned value of x. When x is assigned a new value, a new assignment ID is given in History Element 3710; the subscript is incremented. The next truth evaluation in History Element 3708 uses this new version of x. Because $x_0$ is considered distinct from $x_1$, History Elements 3704 and 3708 are no longer mutually inconsistent, and the path may correctly be determined to be valid.

The history of a path may be used to determine whether the path is false or valid by testing the history for self-consistency. One non-limiting way of doing this is by making use of a theorem solver, which may be a SAT solver or some other theorem prover like a Satisfiability Modulo Theories (SMT) solver or an Integer Linear Programming (ILP) solver. Background on theorem provers may be found in various papers, including *A Decision Procedure for Bit-Vectors and Arrays*, Vijay Ganesh and David L. Dill, Computer Systems Laboratory, Stanford University, 2007; and *Deciding Bit-Vector Arithmetic with Abstraction*, Randal E. Bryant et al, Carnegie Mellon University et al., 2007.

In an exemplary application making use of a SAT solver, one may create a logical AND function out of all of the history elements and then submit the result to be tested for satisfiability by the SAT solver, which will determine whether there are values that can be assigned to the various variables in the history that make the resulting AND expression evaluate to true. If such values exist, then the history is self-consistent; if no such values exist, then the history is inconsistent, and represents a false path.

Figure 38:
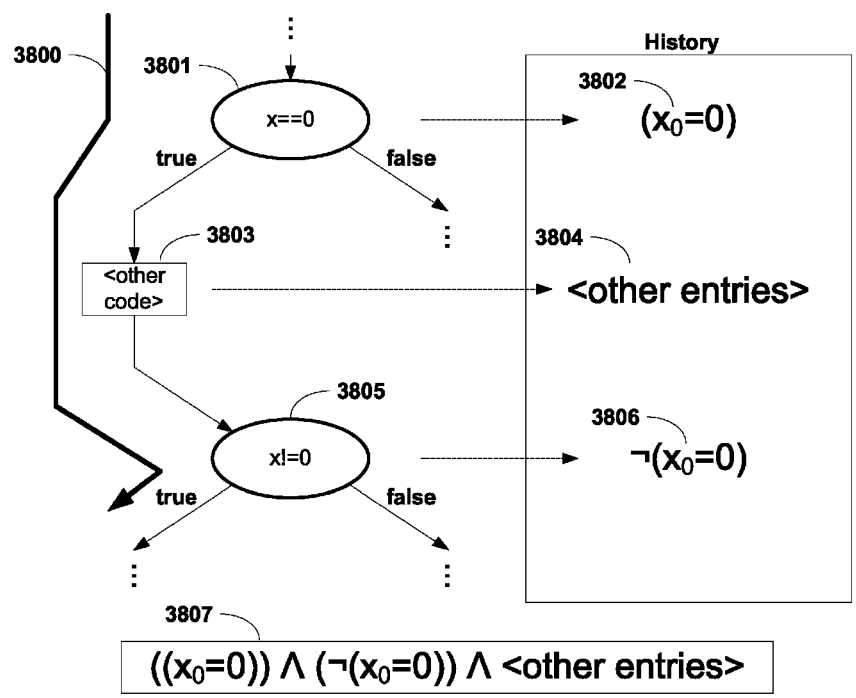
FIG. 38 illustrates the unsatisfiable product of history elements for a false path.

An example of this analysis is shown in FIG. 38. Here Path 3800 is traversed taking the true branch for each decision. Node 3801 contributes History Element 3802. There is some linear code indicated in Block 3803 that is assumed not to affect the value of x, and it contributes some History Elements 3804. Node 3805 contributes History Element 3806. To test for consistency, all history elements, including History Elements 3802, 3804, and 3806, are ANDed together to form Expression 3807, which has been reordered due to commutativity to show the ANDing of History Elements 3802 and 3806. Those two history elements, when ANDed, yield false, rendering the entire AND expression false; this indicates that Path 3800 is false.

Figure 39:
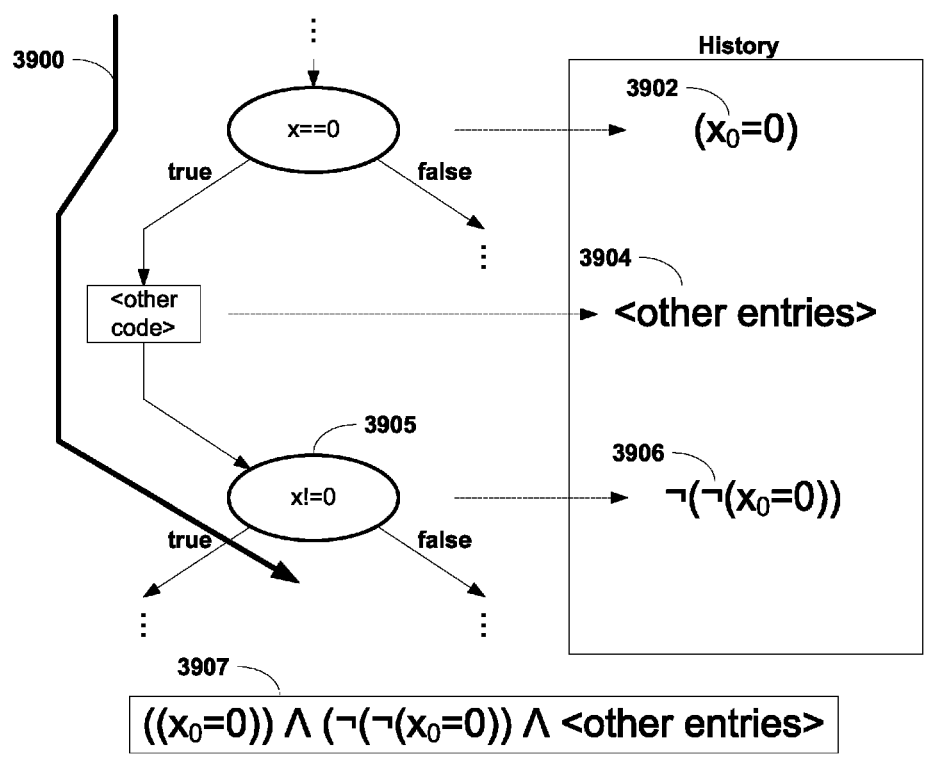
FIG. 39 illustrates the satisfiable product of history elements for a path that is not false.

FIG. 39 illustrates another example of the analysis. Here Path 3900 takes the false branch from Node 3905, yielding History Entry 3906. Now when History Elements 3902, 3904, and 3906 are ANDed together as shown in Expression 3907 (after reordering), the ANDing of History Elements 3902 and 3906 yields a true result, so that assuming the other history elements are mutually consistent (which they should be since there are no decisions), the expression will evaluate to true, indicating that Path 3900 is a valid path.

Figure 40:
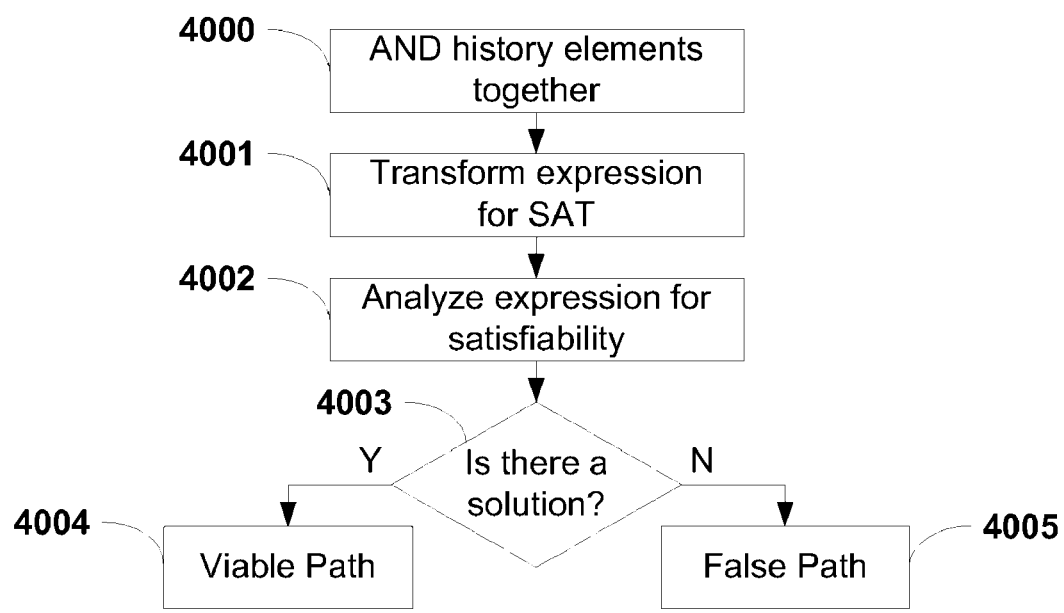
FIG. 40 depicts an exemplary process for testing a path to determine if it is false.

The expression ANDing all of the history elements may require transformation for use in a theorem prover like a SAT solver; the nature of the transformation will be known to one of ordinary skill in the art in light of the description provided here and any documentation pertaining to the theorem prover being used. FIG. 40 illustrates an exemplary summary process in accordance with conventional practices for using a theorem prover to test whether a path is false. First the history elements are ANDed together (Block 4000) and then are transformed for the SAT solver (Block 4001). The transformed expression is then submitted to the SAT solver for satisfiability testing (Block 4002). If the expression was satisfiable (Decision 4003), then the path is valid (Block 4004), otherwise the path is false (Block 4005).

A history may represent a state of a node, but using the entire history as a traversal state is not suitable for annotation since such annotations would consume far too many resources and require too much time for execution. In addition, a cache hit would never occur, since by definition, every path must differ in at least one history element from every other path in order to qualify as a distinct path, and therefore no two distinct execution paths may ever have the same history. Therefore it is useful to identify the subset of history elements that together cause a path to be false. This set of history elements is referred to herein as the "false path signature," and in accordance with this aspect of the invention, is used as described in more detail below for deriving the traversal state at a given node. The false path signature can be derived in a number of ways, including removing history elements one at a time from the history and retesting the resulting history for satisfiability, leaving in those history elements whose removal causes satisfiability and leaving out those whose removal still results in an unsatisfiable history. The specific way in which the false path signature is derived is not intended to limit this aspect of the invention.

One way of deriving the false path signature may be provided through the use of certain theorem provers, which may, if the expression cannot be proved satisfiable, return an expression indicating why the proof failed. Such a returned expression will hereinafter be referred to as a "failure proof." In accordance with another aspect of the invention, by taking advantage of such a theorem prover, the false path signature may be derived from the failure proof. In order for the false path signature to be derived, certain steps may be taken during the transformation of the AND expression for the theorem prover. The process of transforming the history for the theorem prover may involve the creation of multiple subexpressions, each of which may be assigned a name or identifier that may be used in other subexpressions. By storing the names of those subexpressions pertaining to the history elements, their presence in the failure proof enables derivation of the history elements that contributed to the failure; these history elements by definition constitute the false path signature.

Figure 41:
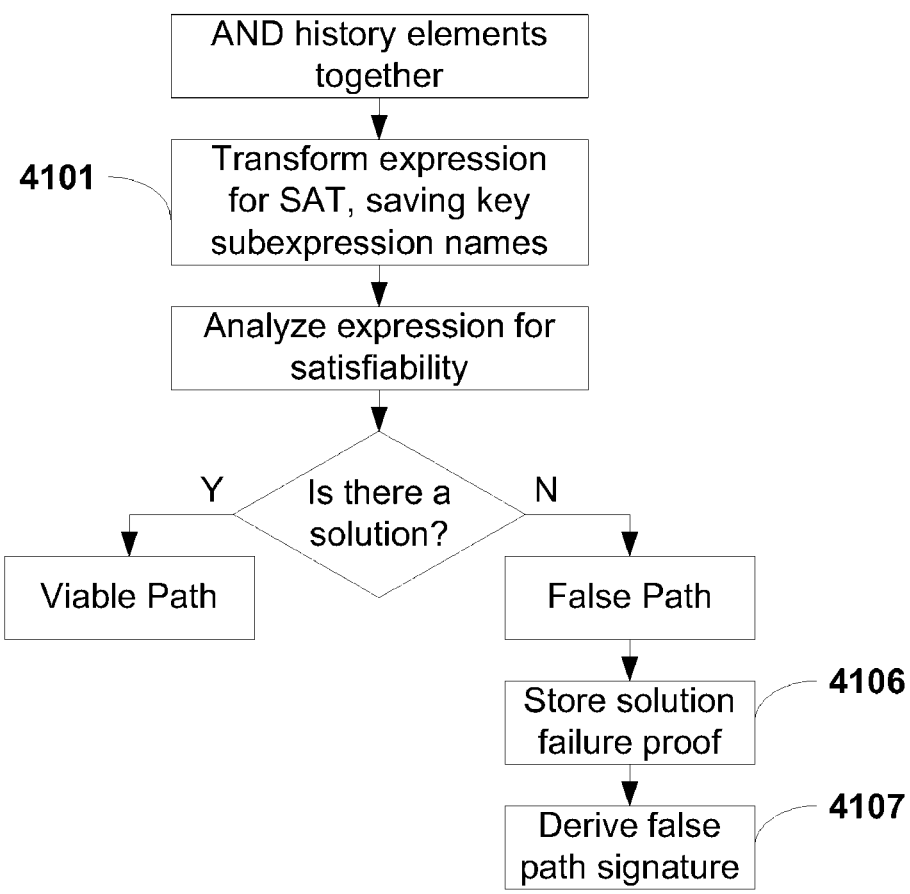
FIG. 41 depicts an exemplary process for testing a path to determine if it is false in a manner that provides for the derivation of a false path signature.

FIG. 41 illustrates an exemplary embodiment of this aspect of the invention. This modifies the prior process of FIG. 40 by saving subexpression names during the transformation of the expression for the SAT solver (Block 4101) in a manner that will be described in more detail below. In addition, if a false path is indicated, then the failure proof returned by the theorem solver is stored (Block 4106) and the false path signature is derived from the failure proof (Block 4107) in a manner that will be described in more detail below.

Figure 42:
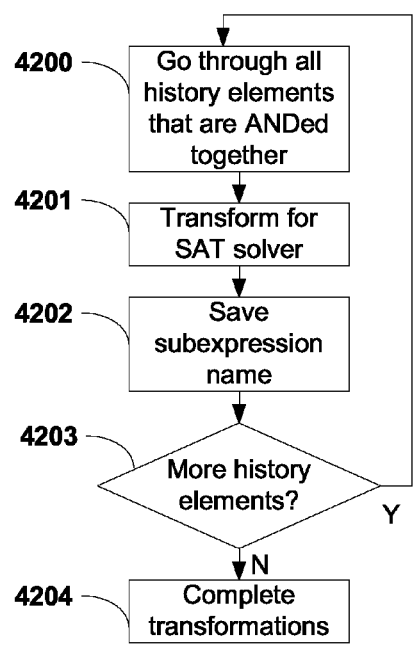
FIG. 42 depicts an exemplary process for transforming the product of history elements for a SAT solver in a manner that provides for the derivation of a false path signature.

An exemplary embodiment illustrating the history transformation of Block 4101 for a SAT solver is illustrated in FIG. 42. In this process all of the elements of the history that have been ANDed together are visited, starting from the first element (Block 4200). Each history element is transformed for the SAT solver (Block 4201) in a manner that will be known to one of ordinary skill in the art in light of the description provided herein and any documentation pertaining to the SAT solver being used. Named subexpressions are created in that process; the name of the subexpression corresponding to each history element is recorded (Block 4202) for future use in deriving the false path signature from the failure proof in Block 4107 of FIG. 41. If there are more history elements to process (Decision 4203), then the next history element is taken (Block 4200) and processed; if not, then any remaining transformation of the entire history is completed (Block 4204).

Figure 43:
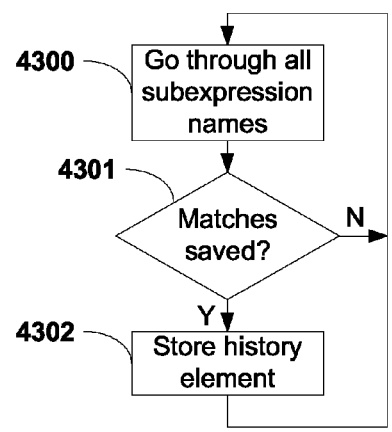
FIG. 43 depicts an exemplary process for creating a false path signature from a satisfiability failure proof.

FIG. 43 illustrates an exemplary embodiment of Block 4107 of FIG. 41, used for deriving the false path signature from the failure proof. All of the subexpression names returned in the failure proof are examined in turn (Block 4300). If a given subexpression name matches one of the subexpression names corresponding to a history element as saved in Block 4202 of FIG. 42 (Decision 4301), then the corresponding history element is stored (Block 4302), and will be included in the false path signature. Once complete, the collection of stored history elements will constitute the false path signature.

As a path is traversed, its history starts out empty, and with each code element visited, a history element is added to the history reflecting the code element, in a manner to be described in more detail below. Therefore the traversal state can only reflect history elements that are a part of the history of that node. No history elements corresponding to nodes below the node being annotated can be used, since if they were, a cache hit would never occur because such a node would by definition never be a part of the history of the annotated node on a future traversal.

Figure 44:
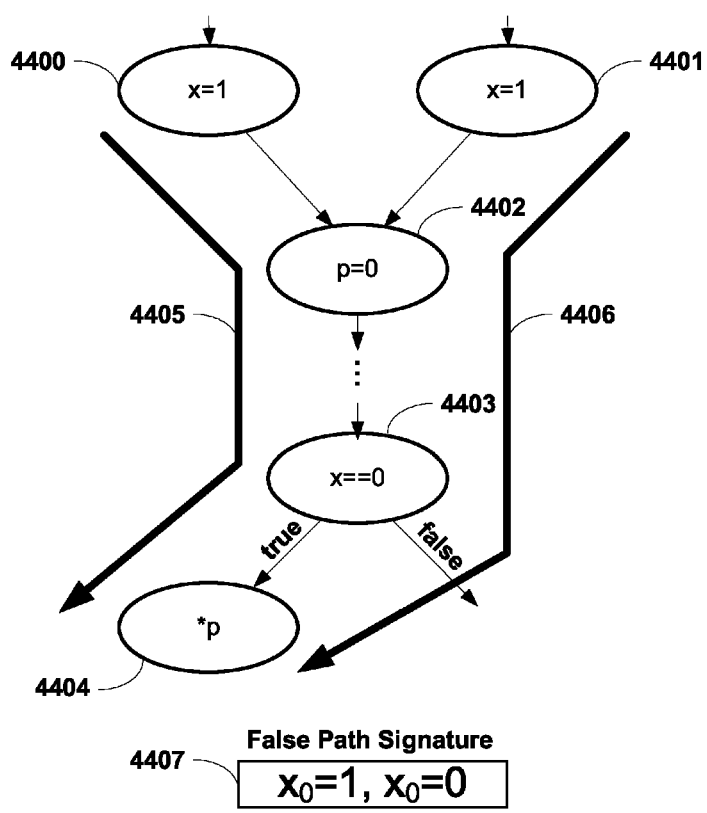
FIG. 44 illustrates an example that demonstrates the need for determining a traversal state node-by-node.

The following drawings illustrate the situation. FIG. 44 shows an exemplary portion of a DAG. Nodes 4400 and 4401 both contain an assignment of x to 1, but they lie on different paths. Those paths merge at Node 4402, in which p is assigned to 0. Node 4403 is a truth decision based on whether x equals 0; if true, flow passes to Node 4404, where p is dereferenced; if not it flows elsewhere. There may be other code between Nodes 4402 and 4403, but for this example it is assumed that any such code does not affect the value of x or p. If this graph is being analyzed by a checker looking for null dereferences, then Node 4404 is a trigger along either path: p is assigned to 0 in Node 4402, and that value persists to Node 4404, where p is dereferenced. However, both Paths 4405 and 4406 are false paths because x has value 1, and can therefore never yield a true result when being tested for equality to 0 in Node 4403. The false path signature 4407 for either path consists of two history elements for the paths, $x_0=1$ and $x_0=0$. The assignment ID 0 is subscripted to x on the assumption that Nodes 4400 and 4401 are the first assignment to x, and that the value of x is not changed before Node 4403. Because $x_0$ cannot both equal 1 and 0, this mutually inconsistent pair of history elements form the false path signature.

Figure 45:
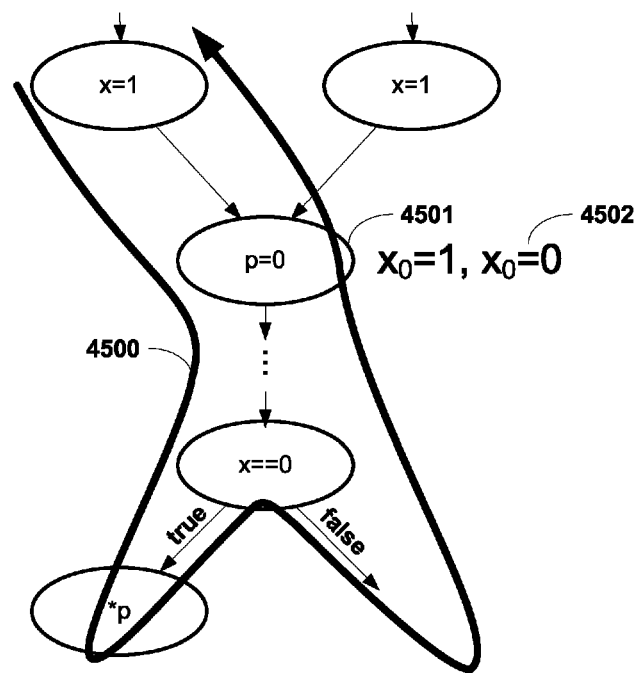
FIG. 45 illustrates a first traversal of the example of FIG. 44.

FIG. 45 illustrates the scenario where one false path is traversed along depth-first Traversal 4500 and as a result of detecting the trigger and then finding that the path is false, the merge point at Node 4501 receives Annotation 4502 using only the false path signature as the traversal state. How this node was chosen for annotation will be discussed in more detail below.

Figure 46:
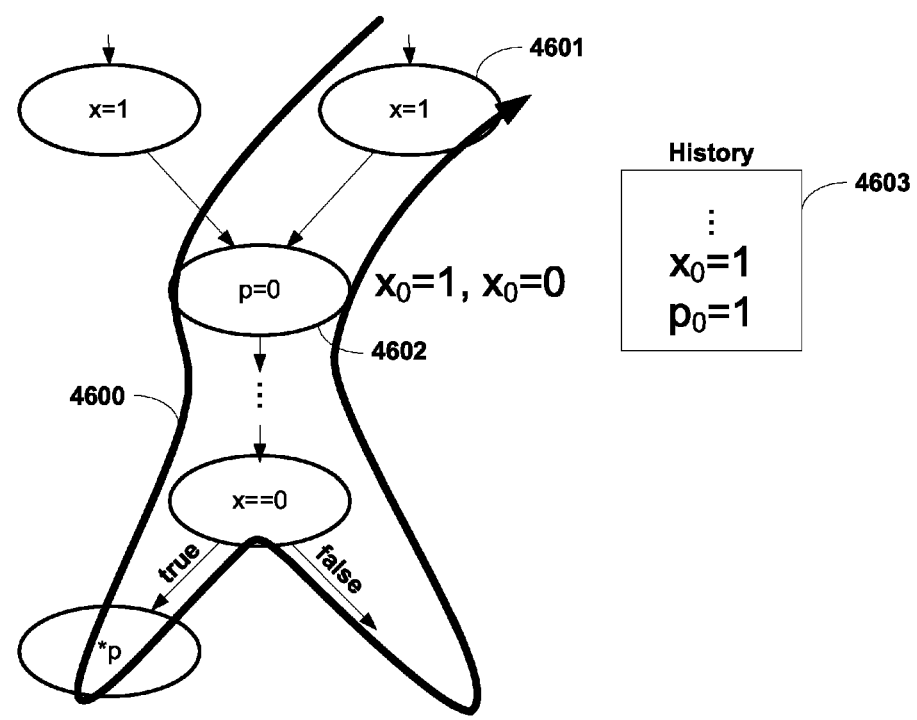
FIG. 46 illustrates a hypothetical second traversal of the example of FIG. 44 with traversal states not derived node-by-node.

FIG. 46 then illustrates the hypothetical scenario when another path Traversal 4600 arrives through Node 4601 and encounters the annotated traversal state at Node 4602. It compares this traversal state with its current traversal history to determine whether a cache hit occurs. One would expect a cache hit to occur because the circumstances of x are identical to that of the first traversal, so no further traversal should be needed. However, History 4603 shows the current traversal history when the comparison is made. It includes all history elements for code up to and including this point, which includes the assignment of x to 1. However, the comparison of x to 0 has not occurred yet on the current traversal, and is therefore not a part of the current history. Thus the cached traversal state is not consistent with the current history, and a cache miss results, causing an unnecessary re-traversal of the nodes.

In order to avoid this, in accordance with another aspect of the invention, the traversal state is determined node-by-node. The position of a node being annotated determines how the node is annotated. Only nodes between and including the first enabler and trigger are annotated. Within this range, all nodes may be annotated, or it may be convenient to annotate only merge points. The choice of which nodes are annotated between the first enabler and trigger is not intended to limit the invention. Because annotation may typically start when a trigger is found, it is likely that nodes below the trigger would not be annotated because they would have not yet been visited. Alternative traversal schemes might result in the annotation of nodes below the trigger; such annotation should not be considered to be outside the scope of the invention, and would be annotated in the same manner as the trigger node is annotated.

The process of deriving the traversal state from the false path signature is based on the notion that no history elements for nodes below the node being annotated can be included in the traversal state. Instead, a useful indicator of the state is the current assignment state of any variables in the included history elements. This traversal state ensures that the included history element results from the most recent traversals in any path that merges at the annotated node. Any traversal where one or more of the variables in an annotated traversal state is in an assignment state different from the annotated current assignment state will not cause a cache hit.

Figure 47:
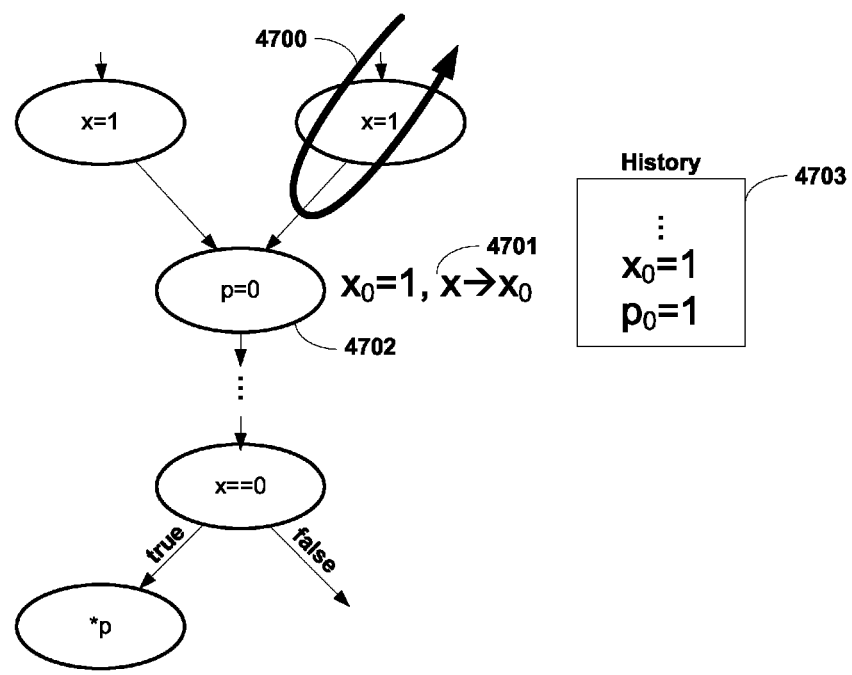
FIG. 47 illustrates a second traversal of the example of FIG. 44 in accordance with embodiments of the invention.

FIG. 47 shows the example of FIG. 46 with annotation done in accordance with embodiments of the invention. Traversal 4700 encounters Annotation 4701 on Node 4702. It compares it to the current history in a manner that will be described in more detail below, finding that the history element in the cached traversal state is in the current History 4703, and that $x_0$ reflects the current assignment ID. A cache hit therefore occurs, and re-traversal is halted.

For purposes of caching and cache hit testing, the current assignment may be maintained as a part of the history or separately from the history. Methods of maintaining the current assignment will be known to one of ordinary skill in the art in light of the description provided here, and are not intended to limit the invention.

It is possible for a path to contain more than two independent sets of conflicting conditions. The way this is handled may vary based on the nature of the way the false path signature is derived. For example, when a theorem prover is utilized, it may isolate just one of the sets of conflicting conditions, ignoring the other(s); which one is selected may not be known. Other ways of isolating a false path signature may result in all conditions being identified, or in multiple sets of conditions being identified. The way the resulting false path signature (or signatures) is used remains consistent with the provisions of embodiments of the invention as described, with possibly differing annotations resulting from the different false path signatures. All of the possible results are consistent with the examples and methods of embodiments of the invention as described herein.

Figure 48:
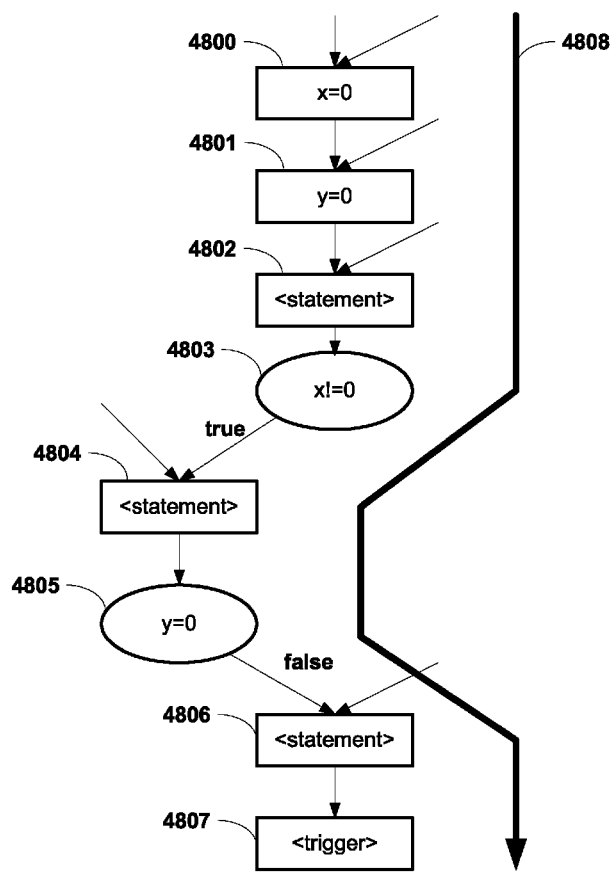
FIG. 48 illustrates an example of a path with two independent false path signatures.

The following example illustrates various ways in which traversal states may be derived in accordance with embodiments of the invention, given various false path signatures that might be derived from the history. FIG. 48 illustrates a portion of a DAG. In Node 4800, a variable x is assigned the value 0, and in Node 4801, a variable y is assigned the value 0. Both Nodes 4800 and 4801 are merge nodes. Node 4802 contains code that doesn't affect the example, but this node is also a merge node. Node 4803 is a test of whether the value of x is not equal to zero, and Path 4808 follows the true decision. Node 4804 is a merge node whose code does not affect the example. Node 4805 contains a test of whether y equals zero, and Path 4808 follows the false path. Node 4806 is a merge node whose code does not affect the example, and Node 4807 is the trigger for some checker, the details of which do not affect the example. The branches not taken from the decisions are omitted for clarity, and do not affect the example.

The history elements resulting from Nodes 4800 and 4803 conflict, as do those from Nodes 4801 and 4805. Therefore there are two independent sets of conflicting conditions giving rise to a false path.

Figure 49:
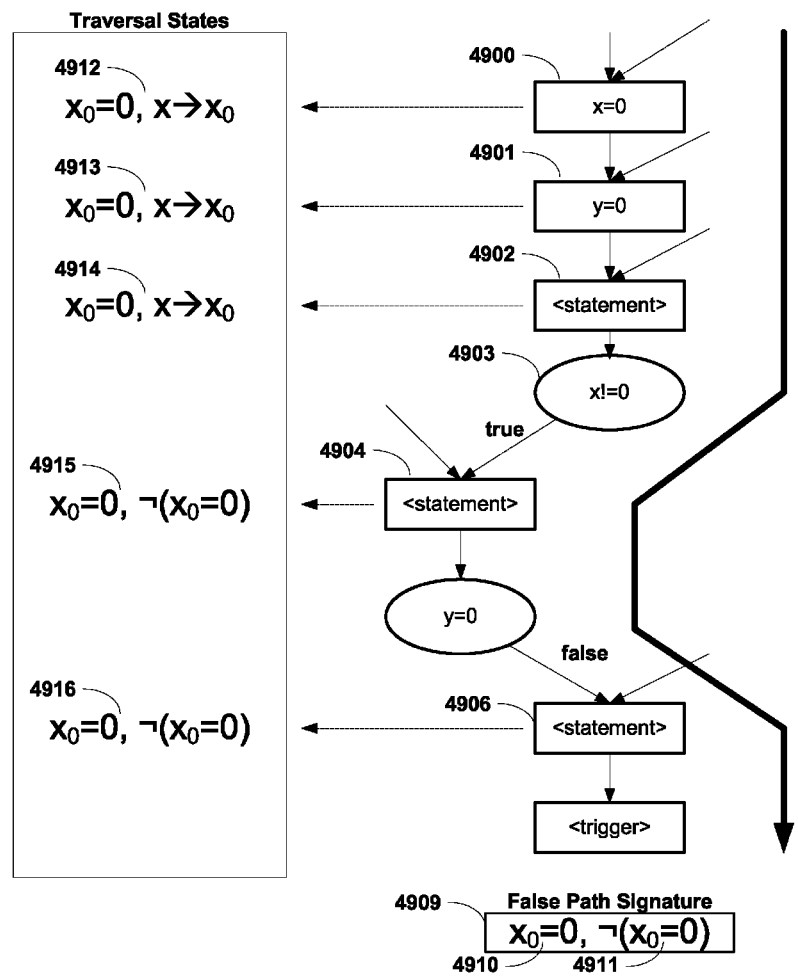
FIG. 49 illustrates one possible set of annotations for the example of FIG. 48.

FIG. 49 illustrates an example where the false path signature derivation process returns only the conflict relating to variable x. False Path Signature 4909 therefore contains two History Elements 4910 and 4911 as shown. In an embodiment annotating only merge points, Nodes 4900, 4901, and 4902 get Traversal States 4912, 4913, and 4914, respectively, since these nodes are all above Node 4903, which has the other conflicting condition involving x. Nodes 4904 and 4906 get Traversal States 4915 and 4916, since they are below Node 4903.

Figure 50:
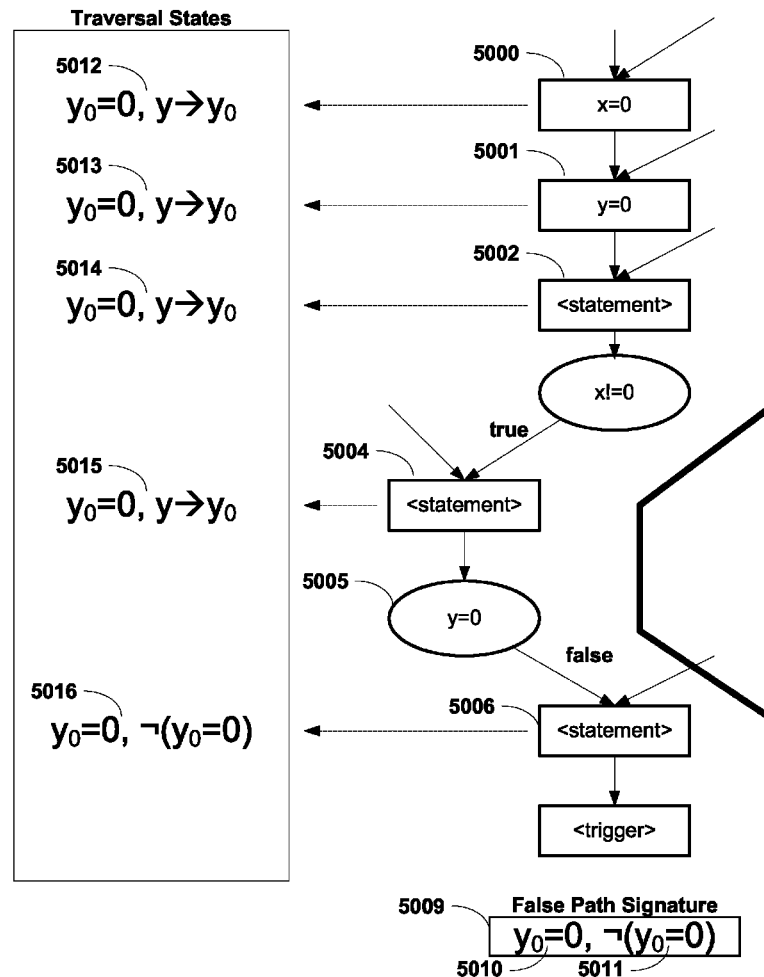
FIG. 50 illustrates another possible set of annotations for the example of FIG. 48.

FIG. 50 illustrates the same example, but where the false path signature derivation process returns only the conflict relating to variable y. False Path Signature 5009 therefore contains two History Elements 5010 and 5011 as shown. In an embodiment annotating only merge points, Nodes 5000, 5001, 5002, and 5004 get Traversal States 5012, 5013, 5014, and 5015, respectively, since these nodes are all above Node 5005, which has the other conflicting condition involving y. Node 5006 gets Traversal State 5016, since it is below Node 5005.

Figure 51:
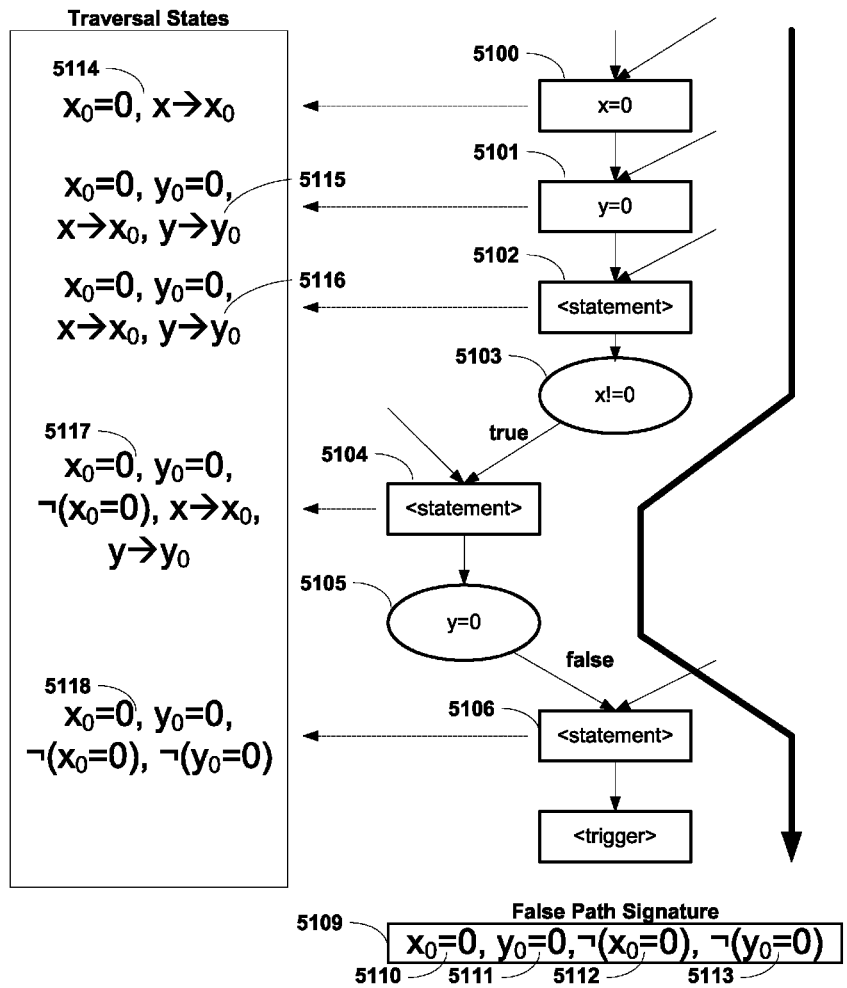
FIG. 51 illustrates yet another possible set of annotations for the example of FIG. 48.

FIG. 51 illustrates the same example, but where the false path signature derivation process returns both conflicts in a single false path signature. False Path Signature 5109 therefore contains four History Elements 5110, 5111, 5112, and 5113 as shown. In an embodiment annotating only merge points, Node 5100 gets Traversal State 5114 because it is above Node 5101; Nodes 5101 and 5102 get Traversal States 5115 and 5116 because they're below Node 5101, but above Node 5103; Node 5104 gets Traversal State 5117 because it's below Node 5103 but above Node 5105; and Node 5106 gets Traversal State 5118 because it's below Node 5105.

Figure 52:
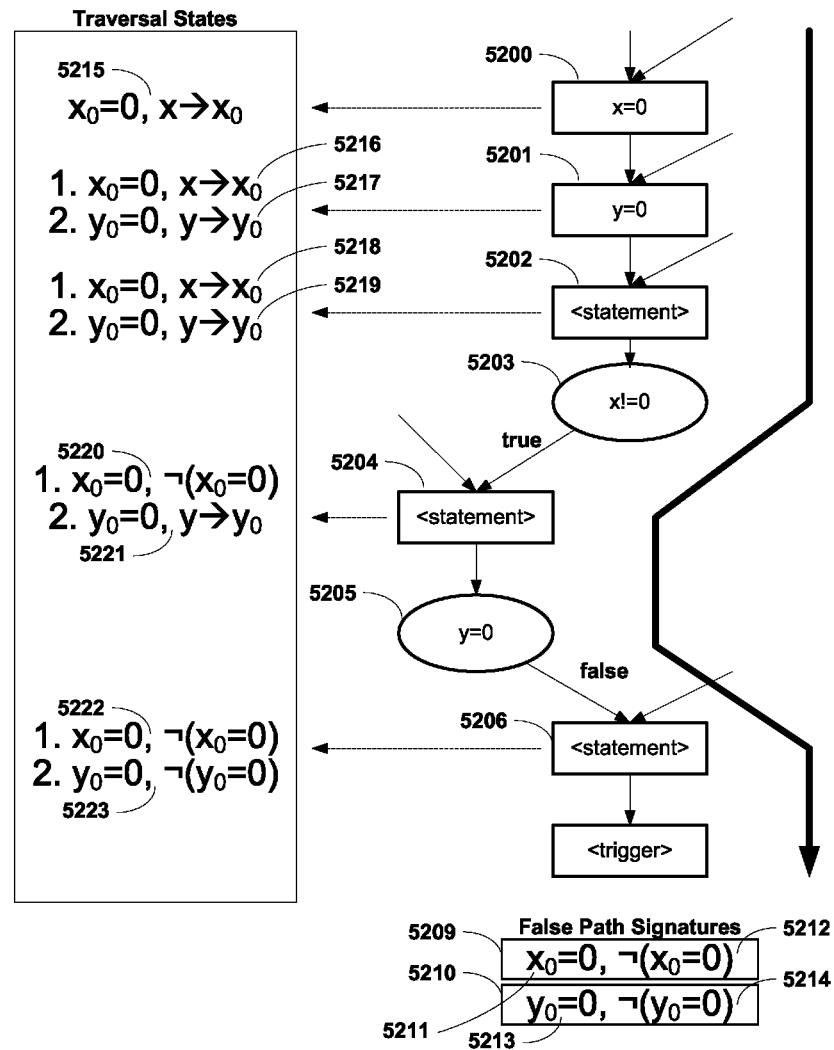
FIG. 52 illustrates yet another possible set of annotations for the example of FIG. 48.

FIG. 52 illustrates the same example, but where the false path signature derivation process returns both conflicts in two separate False Path Signatures 5209 and 5210, having two history elements each: History Elements 5211 and 5212, and History Elements 5213 and 5214, respectively, as shown. In an embodiment annotating only merge points, Node 5200 gets a single Traversal State 5215 because it is above Node 5201; Nodes 5201 and 5202 get two traversal states each: Traversal States 5216 and 5217, and Traversal States 5218 and 5219, respectively, because they're below Node 5201, but above Node 5203; Node 5204 gets two Traversal States 5220 and 5221 because it's below Node 5203 but above Node 5205; and Node 5206 gets two Traversal States 5222 and 5223 because it's below Node 5205.

When testing for a cache hit, as in Decision 804 of FIG. 8, history elements from the traversal state are tested for consistency with history elements from the current traversal history. Prior approaches to this comparison would be to take the text representation of the logic represented by the history elements and to create an internal representation of the logic semantics of each history element, and then compare them on a semantic basis. If the history elements were derived from unrelated sources, this might be necessary since the format and form of each history element might not be predictable. Such semantic comparison can be very time consuming. Similar comparisons may be needed in an embodiment comparing false path signature history elements with history elements in a node's history for deriving the traversal state in accordance with Decision 701 of FIG. 7.

In accordance with another aspect of the invention, it may be appreciated that the process used to create history elements that are part of the traversal state is exactly the same as the process used to create history elements in the current traversal history because the false path signature is derived from a history. Because of this, it is known that the form and format of equivalent history elements will be the same, so that instead of having to do semantic comparisons, structural comparisons may be done instead. This involves confirming the same topological structure, operator(s), operand(s), and constant(s).

Figure 53:
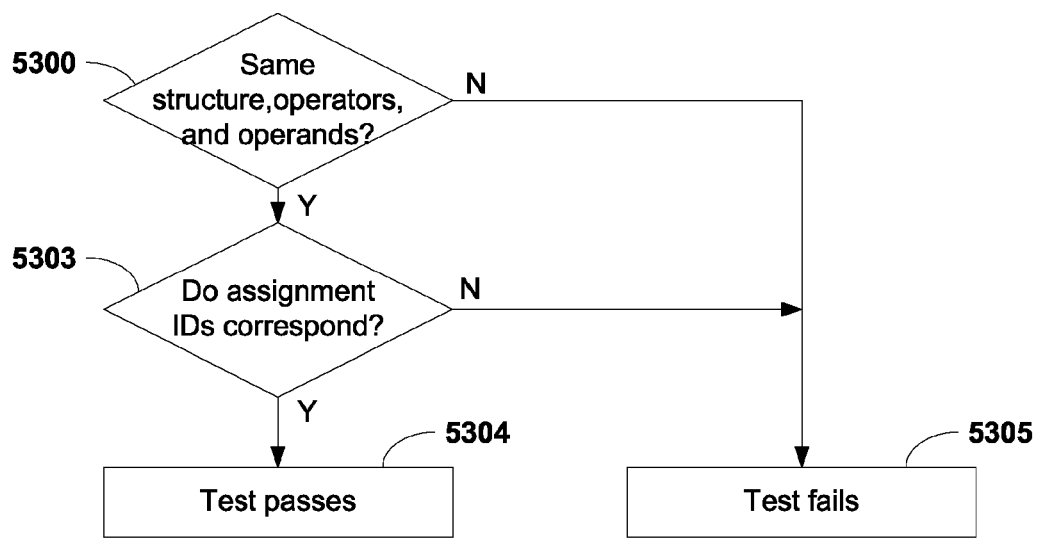
FIG. 53 depicts an exemplary process for implementing a structural comparison of history elements.

FIG. 53 shows an exemplary embodiment of the invention where two history elements are compared for equivalence. First the two history elements are compared for equivalent topological structure and operators (Decision 5300). The assignment IDs are then tested to see if they correspond (Decision 5303); if not, then the test fails (Block 5305). Assignment ID correspondence testing may involve assignment ID mapping, and is described in more detail below. If the assignment IDs correspond, the variables and constants are then compared to see if they match. If they do, then the test passes (Block 5304); otherwise the test fails (Block 5305).

Figure 54:
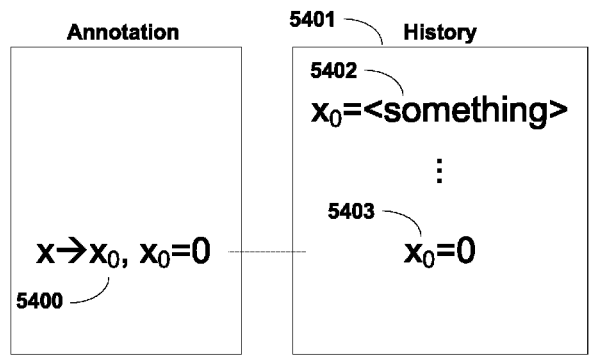
FIG. 54 depicts an example of history elements to be compared.
Figure 55:
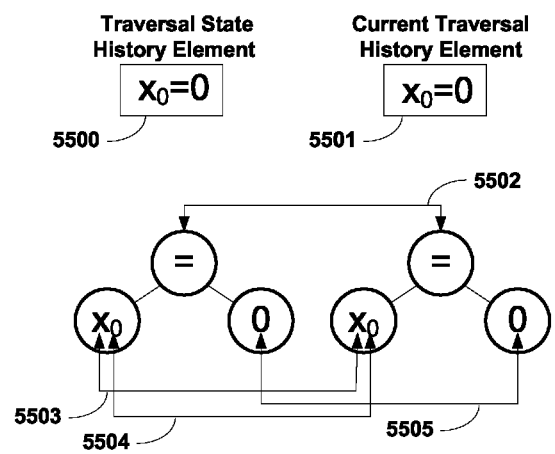
FIG. 55 illustrates the comparison for the example of FIG. 54.

FIG. 54 and FIG. 55 show an illustrative example. FIG. 54 shows the scenario where a node annotated with Traversal State 5400 is found while traversing a path, and the current path traversal is as per History 5401, including an Assignment 5402 to x and a Test 5403 involving x. Because Assignment 5402 is the most recent assignment, the current value for x is $x_0$. The actual value to which x is assigned will not affect this or subsequent similar illustrations.

FIG. 55 illustrates an example of the comparison of history elements consistent with the exemplary method of FIG. 53. History Element 5500, from Traversal State 5400 in FIG. 54, is compared with all of the elements in History 5401, including History Element 5403, which is represented as History Element 5501 of FIG. 55. In this and the following examples, subscripting will be used to implement assignment IDs. For the simplicity of this and the next examples, assignment ID mapping is ignored, and correspondence is considered to be simple equality; more complex correspondence is discussed below. First the structure and operators are noted to be the same (Correspondence 5502) and the variables and constants are noted to be the same (Correspondences 5503 and 5505). The assignment IDs correspond (Correspondence 5504), and so a cache hit occurs.

Figure 56:
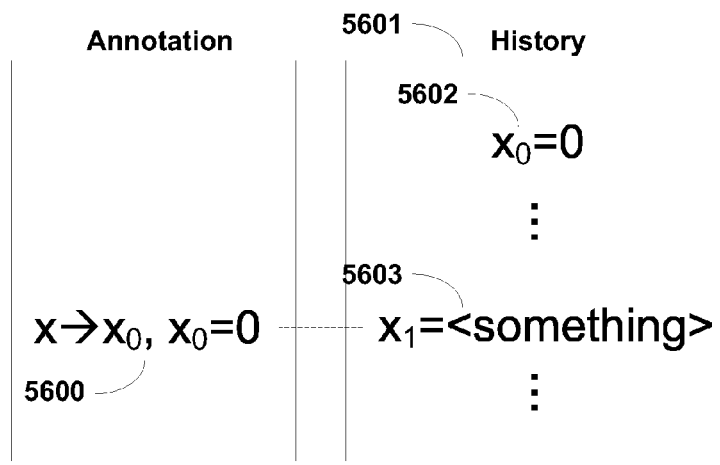
FIG. 56 depicts another example of history elements to be compared.
Figure 57:
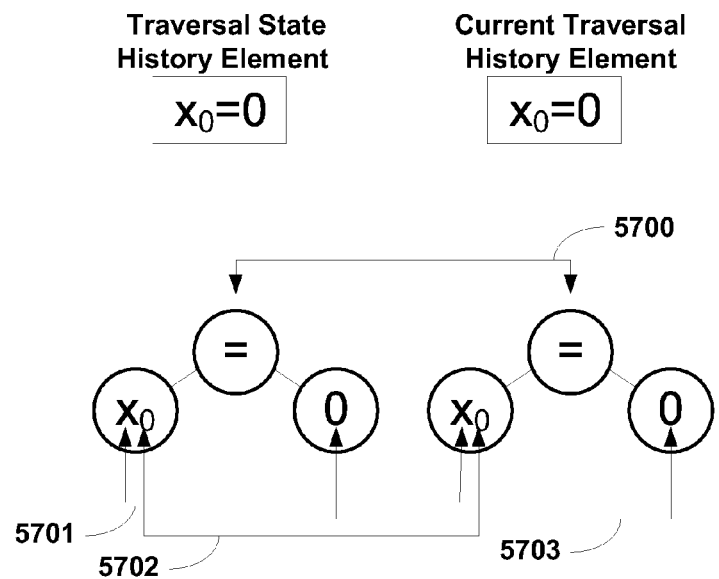
FIG. 57 illustrates the comparison for the example of FIG. 56.

FIG. 56 and FIG. 57 show a similar example. Traversal State 5600 remains the same as in the previous example, but within History 5601, Test 5602 comes before an Assignment 5603 to x. So the current value of x is now $x_1$.

The individual tests in FIG. 57 all still pass, with Correspondences 5700, 5701, 5702, and 5703 matching, but because the current value of x is $x_1$, not $x_0$, the assignment IDs do not correspond, and so the overall test fails and a cache miss occurs.

Figure 58:
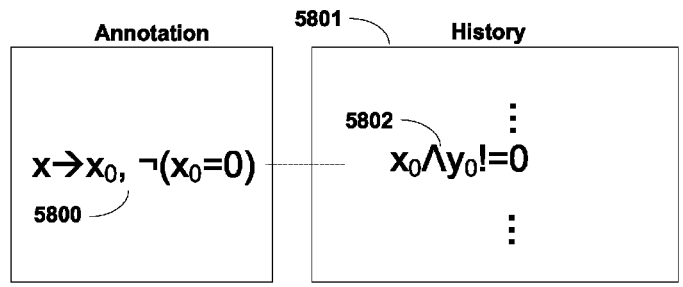
FIG. 58 depicts yet another example of history elements to be compared.

FIG. 58 shows an example where the structures of the elements being compared do not match. Traversal State 5800 contains an expression involving a test of inequality to 0, as does History Element 5802 in History 5801.

Figure 59:
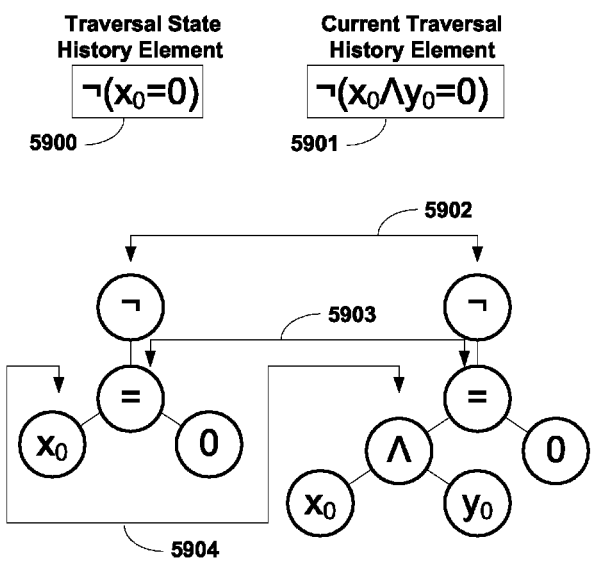
FIG. 59 illustrates the comparison for the example of FIG. 58.

FIG. 59 shows what happens when the structural comparison is made. History Element 5900 is first compared with History Element 5901; Correspondence 5902 matches, so the test proceeds. Next Correspondence 5903 is checked; it also matches. Moving further into the structure, Correspondence 5904 is checked, and this fails, causing a cache miss.

When comparing history elements for correspondence in Decision 502 of FIG. 5 and Decision 5303 of FIG. 53, it is not enough merely to check for equal assignment IDs (in the case of subscripting, equal subscript values) on variables. There is nothing inherently correct about a given assignment ID; assignment IDs are simply incremented as subsequent assignments are made along a path. The number of assignments made along different paths is very likely to be different, such that two paths arriving at the same merge point may well assign different assignment IDs to variables at that merge point.

Figure 60:
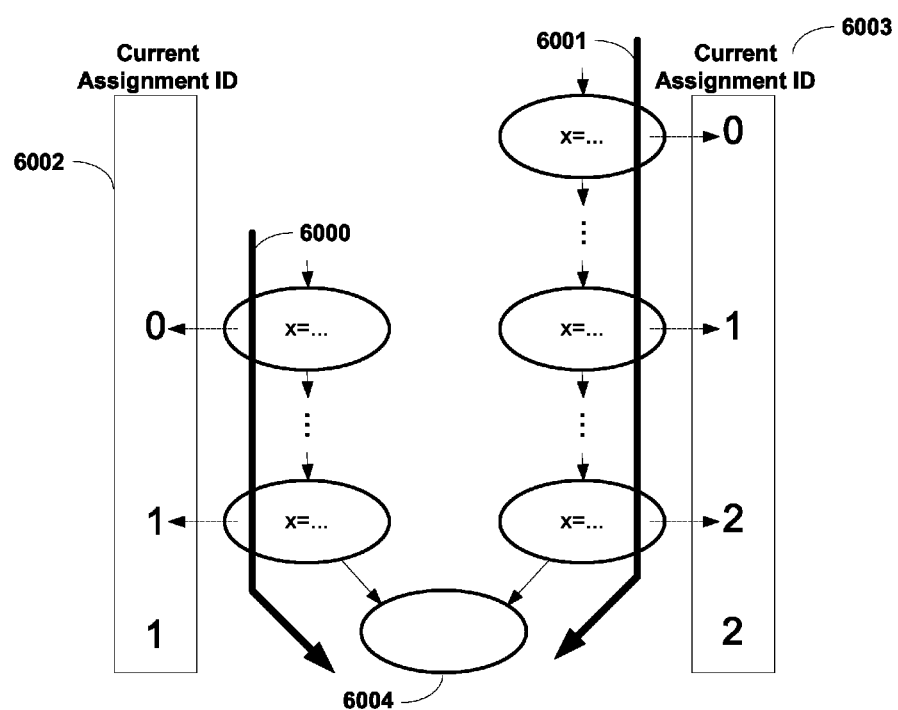
FIG. 60 illustrates two paths with differing numbers of assignments.

An example is illustrated in FIG. 60. Here two traversals, Path 6000 and Path 6001, are compared. Both go through different numbers of nodes; only nodes involving assignments to a variable x are shown. The values assigned to x are omitted for simplicity as they are not relevant to the discussion. Current assignment Box 6002 tracks the current assignment along Path 6000, and current assignment Box 6003 tracks the current assignment along Path 6001. Because Path 6000 has two assignments and Path 6001 has three assignments, when the paths merge at Node 6004, the current assignment for Path 6001 is 1, while the current assignment for Path 6001 is 2.

Therefore when comparing assignment IDs to decide whether history elements or current assignments match, differing assignment IDs may not be an indicator of a mismatch. In the example above, an annotation left while traversing Path 6000, with assignment ID 2, when compared with the current history on Path 6001, with assignment ID 3, should yield a match since they represent the same variable with a current assignment at the same node. The differing assignment IDs is an artifact of the differing paths, which has no bearing on the cache hit test. Therefore a way is needed to map differing assignment IDs so that correspondence can be tested.

In accordance with another aspect of the invention, mapping can be accomplished simply by equating two similar or dissimilar assignment IDs if they have not been mapped before. If they have been mapped before, then two similar or dissimilar assignment IDs that do not correspond per the mapping will not be considered a match.

Figure 61:
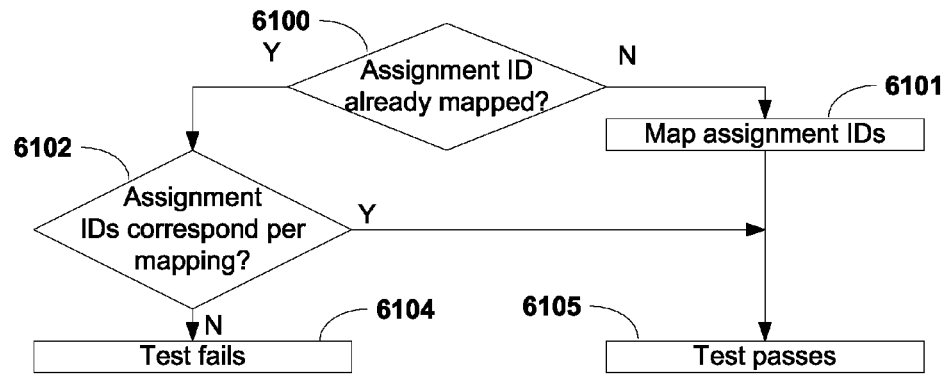
FIG. 61 depicts an exemplary process for testing assignment IDs for correspondence.

FIG. 61 illustrates an exemplary embodiment of the invention wherein assignment IDs are tested for correspondence, per Decision 5303 of FIG. 53. First the assignment ID is checked to see whether it has already been mapped (Decision 6100). Whether or not the assignment ID has been mapped may be tracked by a flag or any other method that will be known to one of ordinary skill in the art in light of the description provided here. If mapping has not yet been done, then the assignment IDs are mapped (Block 6101), and by definition now correspond, and so the test passes (Block 6104). If mapping has been done, then a check is made to see if the assignment IDs correspond per the mapping (Decision 6102); if so, then the test passes (Block 6105); if not, the test fails (Block 6104).

Figure 62:
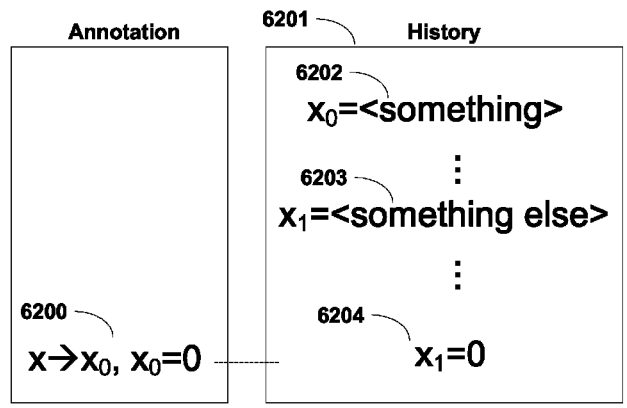
FIG. 62 depicts an example of history elements to be compared where mapping is required.
Figure 63:
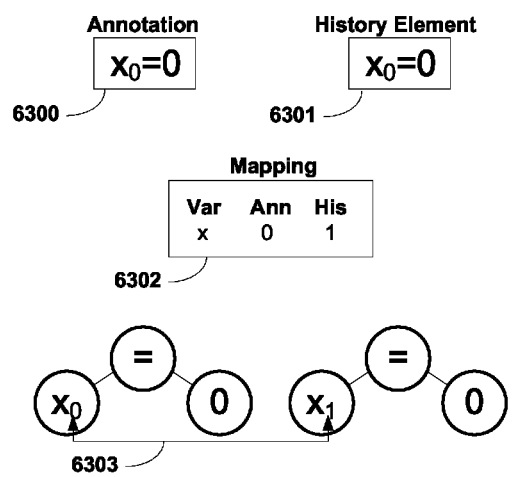
FIG. 63 illustrates the assignment ID comparison for the example of FIG. 62.

FIG. 62 and FIG. 63 illustrate a modification of the example in FIG. 56 and FIG. 57 to include mapping. In FIG. 62, Traversal State 6200 remains as in FIG. 56, but History 6201 contains an initial Assignment 6202 to x, followed by a second Assignment 6203 to x. The current subscript is therefore 1, and Test 6204 is recorded accordingly in History 6201.

FIG. 63 includes the mapping that arises out the comparison between traversal state History Element 6300 and current traversal History Element 6301. The form and variables between the two correspond, but the subscripts do not. In the event that no mapping has yet been established for x, Mapping 6302 is created which builds a correspondence between $x_0$ in the annotations and $x_1$ in the history. This indicates that at this point in the program, what was $x_0$ in the prior traversal is the same variable as what is now $x_1$ on the current traversal. Based on this mapping, even though Correspondence 6303 doesn't show equal subscripts, it does show corresponding subscripts per Mapping 6302. Therefore a cache hit occurs. The means of representing the mapping in an actual implementation may vary, and is not intended to limit the invention.

Figure 64:
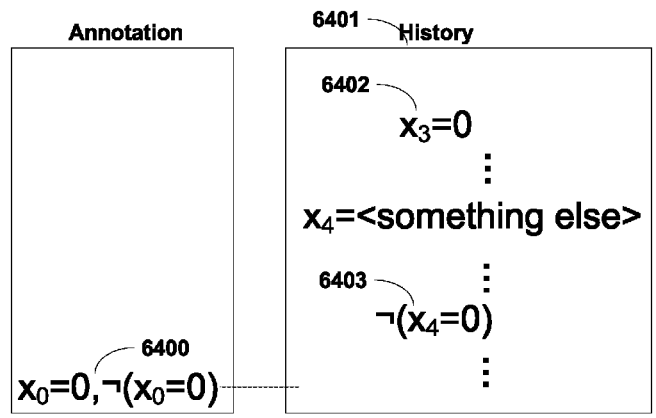
FIG. 64 depicts another example of history elements to be compared where mapping is required.
Figure 65:
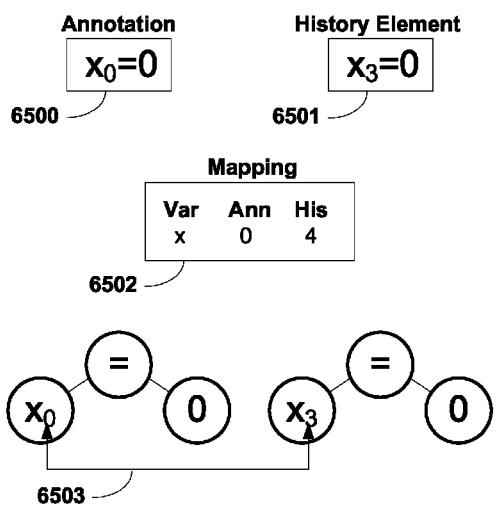
FIG. 65 illustrates the assignment ID comparison for the example of FIG. 64.

FIG. 64 and FIG. 65 illustrate a similar example, but in this case the scenario is that of annotation beyond Node 6403, so the complete set of conflicting conditions is annotated in Traversal State 6400. Meanwhile, History 6401 for the current path traversal contains two history elements involving x, History Elements 6402 and 6403. However, the subscripts on the two tests are different, which will affect the mapping and correspondence.

When the process examines the history and finds History Element 6403, a mapping will be established between subscript 0 in Traversal State 6400 and subscript 4 in History Element 6403. FIG. 65 illustrates the test performed when History Element 6402 is encountered. Here Traversal State 6500 is being compared to History Element 6501. Mapping 6502 has a correspondence between annotation subscript 0 and history subscript 4 for the variable x; Correspondence 6503 is between annotation subscript 0 and history element subscript 3, so the test fails and a cache miss occurs.

Note that the mere difference between the variable subscripts on History Element 6402 and History Element 6403 could be sufficient to determine a cache miss. However, such semantic analysis outside the simple comparison of structure and value may have negative performance consequences, and may not be suitable for a given application. Given a different performance requirement, such variable assignment ID analysis may be acceptable and should not be interpreted as outside the scope of the invention.

Figure 66:
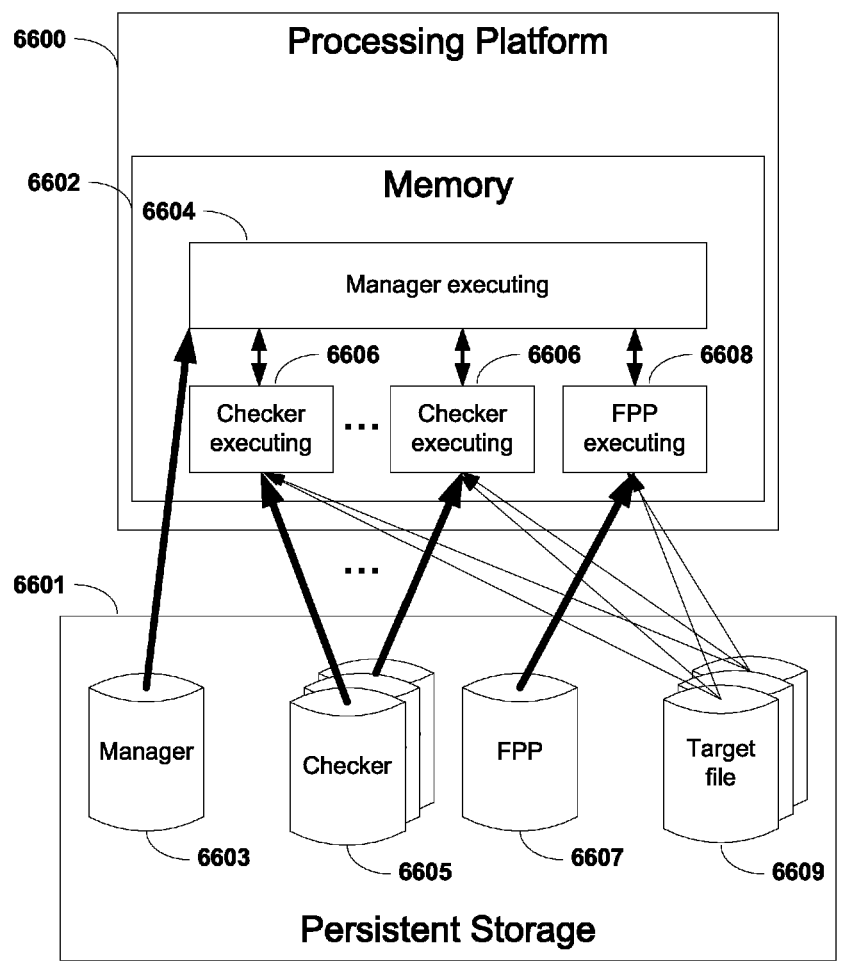
FIG. 66 illustrates a system that executes programs stored on tangible media that implement embodiments of the invention.

In another aspect of the invention, software programs may be constructed implementing the methods described above. FIG. 66 illustrates an exemplary embodiment in which a Processing Platform 6600 is connected to Persistent Storage 6601 by some connection that is not intended to limit the invention. Persistent Storage 6601 may be connected directly to Processing Platform 6600 or may be connected via a network connection, the internet, or some other appropriate method. Persistent Storage 6601 may consist of a variety of media types, including but not limited to hard disk memory, CD, or floppy disk. Processing Platform 6600 has internal processing Memory 6602 in which one or more programs may have images during execution. Persistent Storage 6601 may have a Manager Program 6603, which loads into Memory 6602 as Manager Image 6604; one or more Checker Programs 6605 that load into Memory 6602 as Checker Images 6606; and an FPP Program 6607 that loads into Memory 6602 as FPP Image 6608. The Management Program 6603, Checker Programs 6605, and FPP Program 6607 may collectively implement methods that constitute embodiments of the invention. Target Files 6609 may be analyzed by any or all of the Checker Images 6606 and FPP Image 6608, or any other programs that might appropriately use the information in the Target Files 6609. Target Files 6609 will typically represent computer program code, and may be represented in various ways, including, but not limited to, source code, byte code, or object code. The Manager Program 6603, Checker Programs 6605, FPP Program 6607, and each of the Target Files 6609 may be stored on the same or different media. Computer 6600 may be a single computer or multiple computers executing together. The details of storage and execution are not intended to limit the invention.

What is claimed is:

1. An automated method of analysis of computer program code comprising:

provided a graph structure in computer readable memory that represents control flow of the computer program code;

using a first checker program to traverse a first path within the graph and to check for an occurrence of a first trigger in the course of the traversal of the first path;

detecting by the first checker, a trigger associated with a trigger node on the first path;

using a false path detection program to determine whether the first path is a false path;

if the false path detection program determines that the first path is a false path, then determining a false path signature comprising a combination of traversal history elements that causes the first path to be a false path and determining a first enabler node on the first path that contributes the first history element in the false path signature;

annotating nodes between the trigger and the first enabler with a traversal state;

wherein any history elements in the false path signature that are in the history of the node being annotated are included in the traversal state for that node;

wherein any history elements in the false path signature that are not in the history of the node being annotated are omitted from the traversal state for that node;

wherein if any history elements in the false path signature are omitted from the traversal state for the node being annotated, a current assignment state is included in the traversal state for each variable in the history elements in the false path signature that were included in the traversal state for the node being annotated;

using the first checker program to traverse a second path within the graph and to check for an occurrence of a first trigger in the course of the traversal of the second path;

wherein the second path merges with the first path at or above the first node and below the first enabler node;

determining by the first checker that the first checker previously traversed a portion of the second path that merges with the first path in a checker state that is the same as a current checker state of the first checker;

comparing a traversal state indicated by the annotation of the first node with a history of the second path;

comparing an assignment state of the first variable indicated by the annotation of the first node with a current assignment state of the first variable associated with the first node in the history of the second path;

if both the comparison steps result in finding matches then ending the traversal of the second path by the first checker; and if at least one of the comparison steps does not find a match, then continuing the traversal of the second path by the first checker.

* * * * *